US011539783B1

(12) United States Patent
Gupta et al.

(10) Patent No.: US 11,539,783 B1
(45) Date of Patent: Dec. 27, 2022

(54) EFFICIENT DOWNLOADING OF FILES TO MULTIPLE USERS IN PROXIMITY OF ONE ANOTHER

(71) Applicant: Citrix Systems, Inc., Fort Lauderdale, FL (US)

(72) Inventors: R V Shouri Gupta, Bangalore (IN); Achyuth Nandikotkur, Victoria (CA)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/546,490

(22) Filed: Dec. 9, 2021

(51) Int. Cl.
| | |
|---|---|
| *H04L 67/06* | (2022.01) |
| *H04W 4/02* | (2018.01) |
| *H04L 67/104* | (2022.01) |
| *H04L 9/40* | (2022.01) |
| *H04W 76/10* | (2018.01) |
| *H04W 12/04* | (2021.01) |
| *H04W 4/029* | (2018.01) |
| *H04W 4/80* | (2018.01) |

(52) U.S. Cl.
CPC ............ *H04L 67/06* (2013.01); *H04W 4/023* (2013.01); *H04W 4/029* (2018.02); *H04W 4/80* (2018.02); *H04W 12/04* (2013.01); *H04W 76/10* (2018.02)

(58) Field of Classification Search
CPC ... H04L 67/06; H04L 67/104; H04L 63/0407; H04L 63/0442; H04W 4/029; H04W 4/80; H04W 76/10; H04W 4/023; H04W 12/04

See application file for complete search history.

(56) References Cited

U.S. PATENT DOCUMENTS

| | | | | |
|---|---|---|---|---|
| 2007/0136297 A1* | 6/2007 | Choe | .................. | H04L 67/34 |
| 2007/0294088 A1* | 12/2007 | Thelen | .................. | G07F 17/32 |
| | | | | 705/1.1 |
| 2008/0108437 A1* | 5/2008 | Kaarela | .................. | A63F 13/34 |
| | | | | 463/43 |
| 2009/0094600 A1* | 4/2009 | Sargaison | .............. | A63F 13/77 |
| | | | | 717/176 |
| 2010/0161755 A1* | 6/2010 | Li | .................. | H04L 67/104 |
| | | | | 709/217 |
| 2011/0029968 A1* | 2/2011 | Sanders | .................. | G06F 8/61 |
| | | | | 718/1 |
| 2012/0011247 A1* | 1/2012 | Mallik | .................. | H04L 67/104 |
| | | | | 709/224 |

(Continued)

OTHER PUBLICATIONS

U.S. Appl. No. 17/711,166, filed Apr. 1, 2022.

*Primary Examiner* — Chris Parry
*Assistant Examiner* — Hassan A Khan
(74) *Attorney, Agent, or Firm* — Pierce Atwood LLP

(57) ABSTRACT

In one disclosed method, a computing system receives, from a first remote device, a first request for a file and determines that at least a second remote device is within a proximity of the first remote device. The computing system further divides the file into at least a first portion and a second portion. The computing system further sends, to the first remote device, the first portion of the file and sends, to the second remote device, the second portion of the file. The computing system further sends, to the second remote device, first data to enable the second remote device to establish a connection with the first remote device, for transfer of at least the second portion of the file to the first remote device via the connection with the second remote device.

19 Claims, 19 Drawing Sheets

(56) References Cited

U.S. PATENT DOCUMENTS

| | | | |
|---|---|---|---|
| 2013/0326494 A1* | 12/2013 | Nunez | H04L 41/0893 |
| | | | 717/172 |
| 2014/0280604 A1* | 9/2014 | Ahiska | H04L 67/10 |
| | | | 709/205 |
| 2016/0119739 A1* | 4/2016 | Hampel | H04W 4/70 |
| | | | 370/329 |
| 2017/0318098 A1* | 11/2017 | Sanghvi | H04W 84/18 |
| 2018/0006895 A1* | 1/2018 | Burba | H04L 67/104 |
| 2020/0226101 A1* | 7/2020 | Dhanabalan | H04L 65/1083 |
| 2020/0274922 A1* | 8/2020 | Lisewski | H04L 67/108 |

* cited by examiner

EFFICIENT DOWNLOADING OF FILES TO MULTIPLE USERS IN PROXIMITY OF ONE ANOTHER

BACKGROUND

Various file sharing systems have been developed that allow users to share files or other data. ShareFile®, offered by Citrix Systems, Inc., of Fort Lauderdale, Fla., is one example of such a file sharing system.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves receiving, by a computing system and from a first remote device, a first request for a file; determining, by the computing system, that at least a second remote device is within a proximity of the first remote device; dividing, by the computing system, the file into at least a first portion and a second portion; sending, from the computing system to the first remote device, the first portion of the file; sending, from the computing system to the second remote device, the second portion of the file; and sending, from the computing system to the second remote device, first data to enable the second remote device to establish a connection with the first remote device, for transfer of at least the second portion of the file to the first remote device via the connection with the second remote device.

In some of the disclosed embodiments, a method involves sending, from a first device to a remote computing system, a request for a file from a computing system; establishing, by the first device, a wireless connection with at least a second device in proximity of the first device; receiving, by the first device and from the remote computing system, a first portion of the file; receiving, by the first device and from the second device via the wireless connection, a second portion of the file; and combining, by the first device, the first portion of the file and the second portion of the file to generate a complete copy of the file.

In some of the disclosed embodiments, a system includes at least one processor and at least one computer-readable medium encoded with instructions which, when executed by the at least one processor, cause the system to receive, from a first remote device, a first request for a file; determine that at least a second remote device is within a proximity of the first remote device; divide the file into at least a first portion and a second portion; send, to the first remote device, the first portion of the file; send, to the second remote device, the second portion of the file; and send, to the second remote device, first data to enable the second remote device to establish a connection with the first remote device, for transfer of at least the second portion of the file to the first remote device via the connection with the second remote device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A provides an introduction to example embodiments of a system for efficient downloading of files to multiple devices within a proximity;

Section B describes a network environment which may be useful for practicing embodiments described herein;

Section C describes a computing system which may be useful for practicing embodiments described herein.

Section D describes embodiments of systems and methods for delivering shared resources using a cloud computing environment;

Section E describes example embodiments of systems for providing file sharing over networks;

Section F provides a more detailed description of example embodiments of the system introduced in Section A; and Section G describes example implementations of methods, systems/devices, and computer-readable media in accordance with the present disclosure.

A. Introduction to Illustrative Embodiments of a System for Efficient Downloading Files to Multiple Devices within a Proximity Various file sharing systems have been developed that allow users to share files with other users over a network. However, when multiple users request a file at the same time, a bottleneck at the file server may occur. As an example scenario, a presenter at a conference may want to share digital materials and associated files to all the attendees. The presenter may provide, as a means to access the materials, one or more access links directed to a file server, such as by using Citrix ShareFile® from Citrix Systems, Inc., of Fort Lauderdale, Fla. Traditionally, in this situation individual attendees of the conference may use the provided access link(s) to download the materials by respective requests to the file server. The file server may become overloaded and the file downloads may become slow as the file server responds to the numerous requests. In this situation, where there are multiple users requesting the same content at almost the same time, a large amount of bandwidth may be required and a large processing burden may be imposed on the file server to cater to the requests.

The inventors have recognized and appreciated that in many scenarios where a group of users may attempt to download the same file at the same time, at least some of the group of users may be physically located within a proximity of each other, such as in the conference scenario. Thus, instead of different users accessing the file server individually to download the whole file, an opportunity may exist, based on the proximity of the users and their respective devices, for the users' devices to individually download portions of the file. The file portions may then be merged back into the file by one of the user devices, which may then share the file among the group of users based on proximity, such as with Wi-Fi or Bluetooth connections.

Figure 5A:
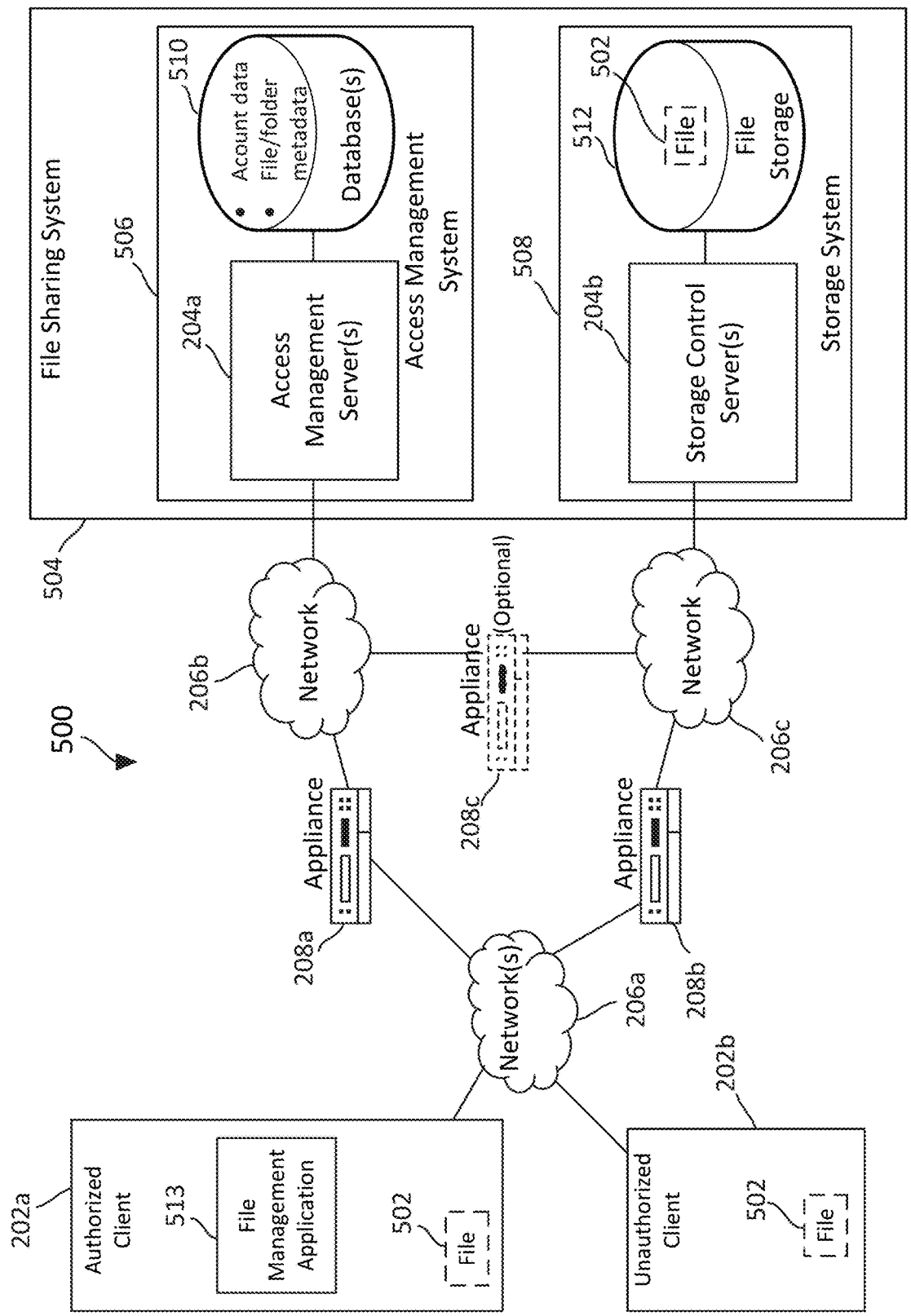
FIG. 5A is a diagram illustrating how a network computing environment like one shown in FIG. 2 may be configured to allow clients access to an example embodiment of a file sharing system.
Figure 5B:
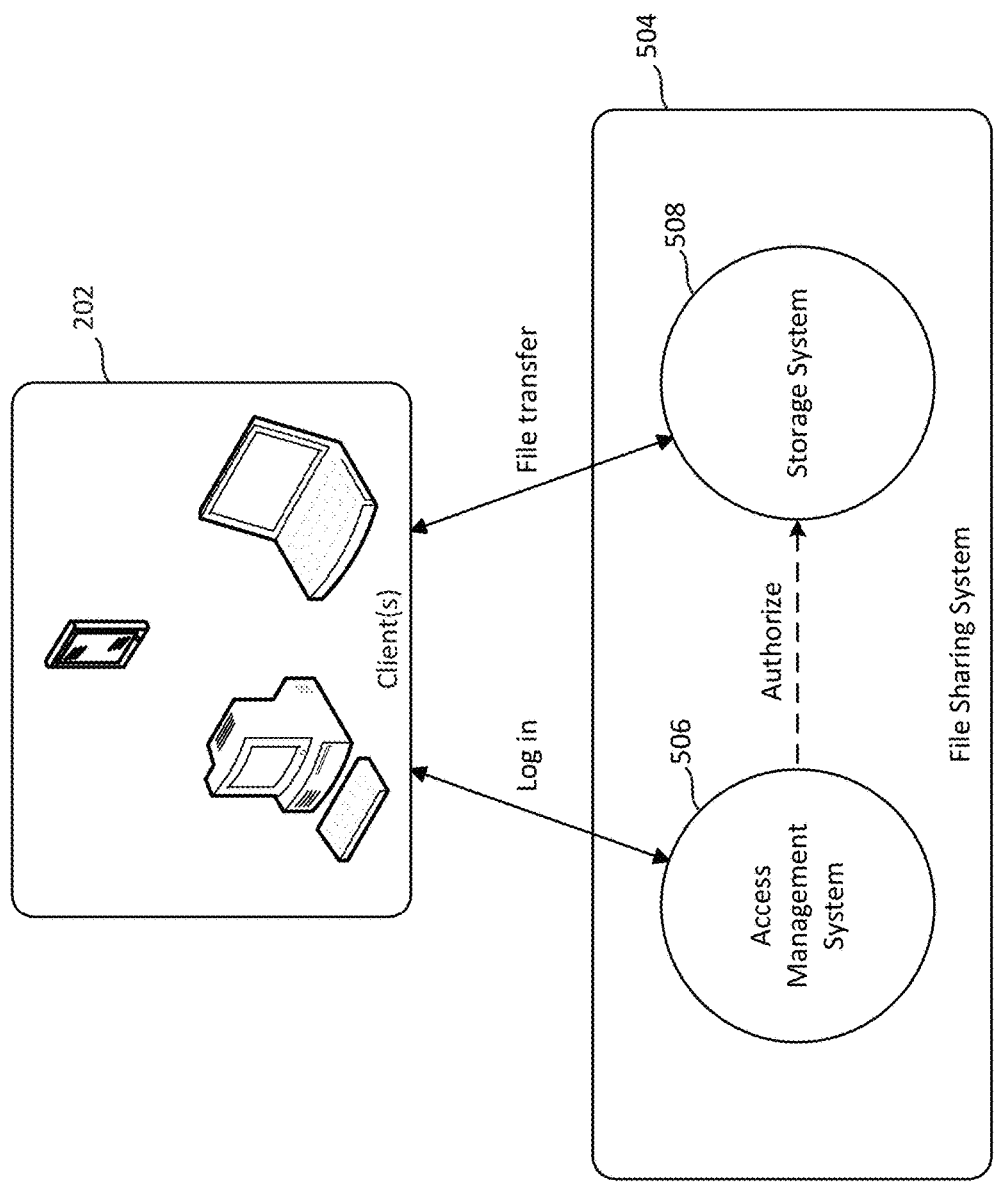
FIG. 5B is a diagram illustrating certain operations that may be performed by the file sharing system shown in FIG. 5A in accordance with some embodiments.
Figure 5C:
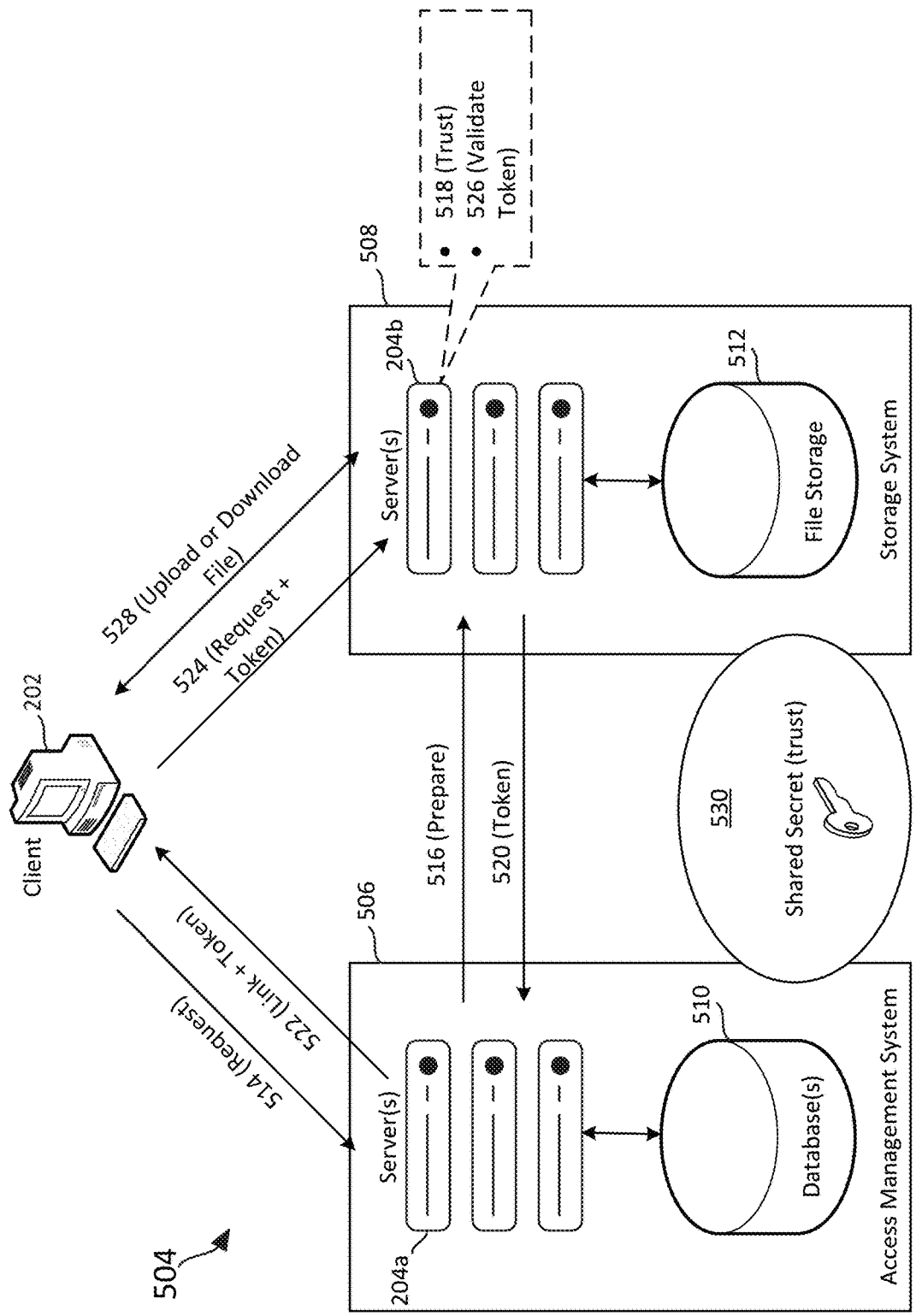
FIG. 5C is a diagram illustrating additional operations that may be performed by the file sharing system shown in FIG. 5A in accordance with some embodiments.

The file sharing system 504 described below (in Section E) in connection with FIGS. 5A—C is an example of a file server with which the collaborative downloading techniques described herein may be employed. As explained in Section E, in some implementations, one client device 202 may upload a file 502 (shown in FIG. 5A) to a central repository of the file sharing system 504, such as the storage medium(s) 512 shown in FIGS. 5A—C, and another client device 202 may then download a copy of that file 502 from the same repository. As Section E also describes, in some implementations, an access management system 506 may regulate the circumstances in which files 502 may be uploaded and/or downloaded to/from a storage system 508 (including the storage medium 512(s)) by various client devices 202.

Offered are systems and techniques for dividing a file into multiple data fragments (referred to herein as "chunks") and downloading different ones of those chunks from a file server (e.g., the file sharing system 504) to respective client devices 202 that are located within a physical proximity of one another. Because the respective client devices 202 are located within the same physical proximity, the different client devices 202 may share their respective chunks (e.g., via one or more wireless peer-to-peer connections) and thus enable at least one of the client devices 202 to merge the chunks into a complete copy of the file at a local level. In some implementations, one of the client devices 202 may be responsible for assembling the chunks to generate the complete copy of the file, and then distribute the complete copy of the file to the other client devices 202. In other implementations, individual client devices 202 may instead be responsible for receiving the various chunks from the other client devices 202 and for assembling those chunks to generate their own complete copies of the file.

In some implementations, the storage system 508 (shown in FIGS. 5A-C) may recognize multiple requests for the same file within a given time period and implement a distributed and shared downloading of the file based on the proximity of the requesting devices. This approach may simplify the process for multiple users, which are in a proximity of one another, to access data objects, such as files, videos, documents, or any related material, and to download the data objects seamlessly in an efficient and fast method. This may provide for the load on the storage system 508 to be reduced and enable the storage system 508 of the file sharing system 504 to cater to and prioritize other file requests.

Figure 1A:
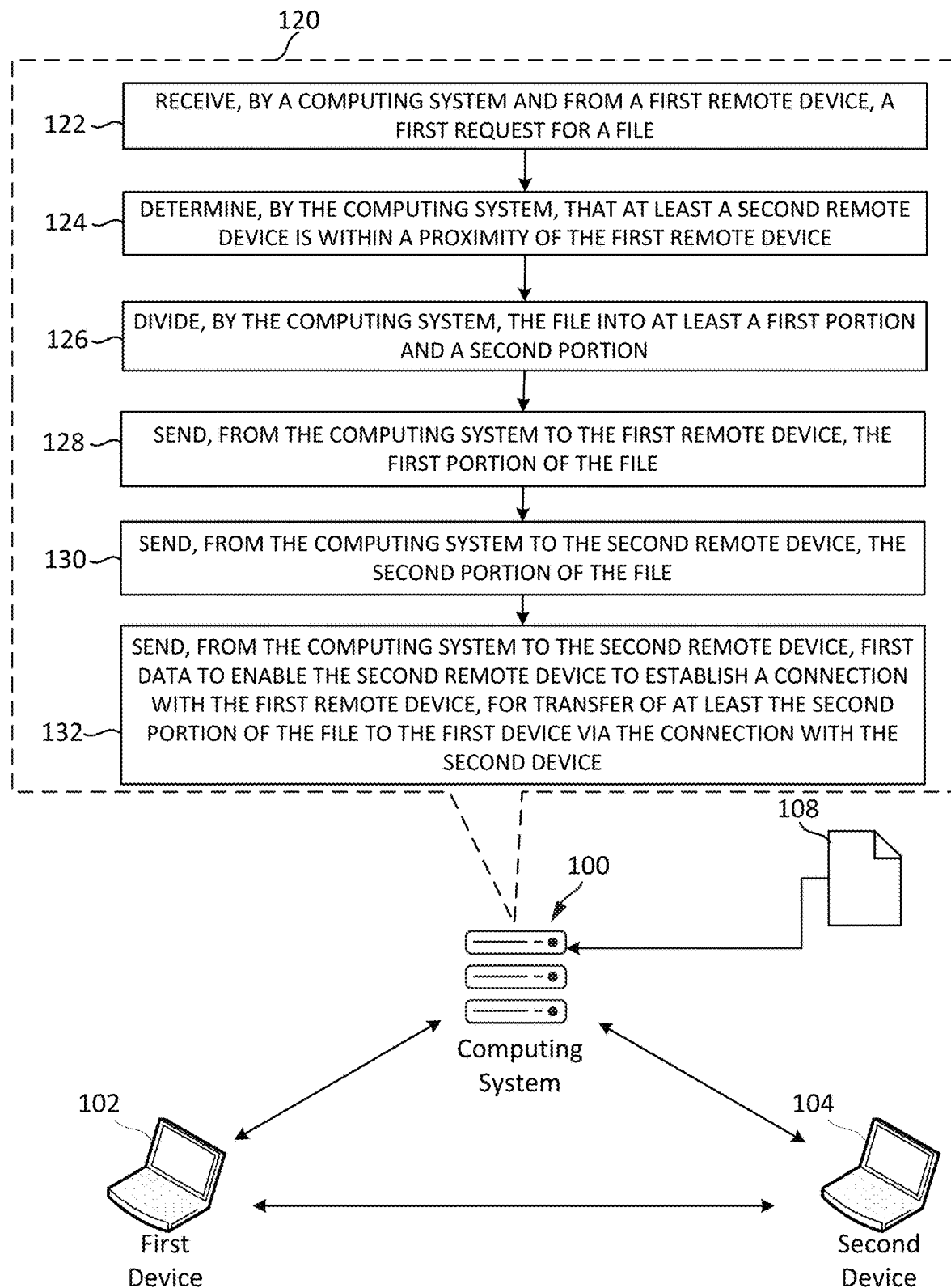
FIG. 1A is a high-level diagram illustrating a computing system initiating collaborative downloading of a file by multiple client devices within a proximity, in accordance with some embodiments of the present disclosure.

FIG. 1A is a high-level diagram illustrating how a computing system 100 may initiate collaborative downloading of a file 108 by multiple client devices 202 (e.g., a first device 102 and a second device 104) within a proximity of one another, in accordance with some embodiments of the present disclosure. In some embodiments, the computing system 100 may be part of the file sharing system 504. In other embodiments, the file sharing system 504 may be in communication with the computing system 100. In some embodiments, the computing system 100 may include one or more servers 204 (examples of which are described below in relation to FIG. 2). For example, in some implementations, the server(s) 204 used to implement the computing system 100 may be included amongst the server(s) 204b of the storage system 508 described in Section E.

The first device 102 and the second device 104 may be respective client devices 202 (examples of which are described in Sections B-D below). Although only two such client devices 202 are shown in FIG. 1A, it should be appreciated that additional client devices 202 may be employed in some implementations. The client devices 202 (e.g., the first device 102 and the second device 104) may be in communication with the computing system 100 using one or more networks 206 (examples of which are described below). In some implementations, file sharing applications may be installed on the client devices 202 and a user may use such a file sharing application to request the download of the file 108 from the computing system 100. In some implementations, the user of client device 202 may alternatively use a browser-based file sharing application to request the download of the file 108 from the computing system 100. The file management application 513 described in Section E (in connection with FIG. 5A) is an example of a file sharing application that may be used for such purposes. An example routine 120 that may be performed by the computing system 100 is illustrated.

As shown in FIG. 1A, at an operation 122 of the routine 120, the computing system 100 may receive a first request for the file 108 from the first device 102. In some implementations, the computing system 100 may similarly receive a second request for the file 108 from the second device 104. Further, in some implementations, the computing system 100 may additionally transmit requests to the first device 102 and the second device 104 (and perhaps other client devices 202 that also requested the file 108) for permission to download the file 108 using collaborative downloading. The requesting devices (e.g., the first device 102 and the second device 104) may output prompts (e.g., via the file sharing applications) for user permission to download the file 108 with collaborative downloading. The respective client devices 202 may transmit the user permission or denial to the computing system 100.

In some implementations, one or more of the requesting client devices 202 may detect one or more other client devices 202 within the same vicinity. For example, in some implementations, one or more of the client devices 202 may use a short range wireless radio, such as a Bluetooth or Wi-Fi transceiver, to identify one or more other client devices 202 within a physical proximity. In some implementations, the detection of one or more other client devices 202 within a proximity may be performed in response to the user granting permission to download the file 108 using collaborative downloading. In some implementations, one or more requesting client devices 202 may additionally or alternatively transmit their global positioning system (GPS) coordinates to the computing system 100.

At an operation 124 of the routine 120, the computing system 100 may determine that at least the second device 104 is within a proximity of the first device 102. This determination may be, for example, based on data received from one or more of the requesting client devices 202, with the data identifying one or more other client devices 202 within the proximity of the requesting client device 202. For example, in some implementations, the computing system 100 may receive data from the first device 102 indicating that the first device 102 detected that the second device 104 was within a proximity of the first device 102. In other implementations, the computing system 100 may additionally or alternatively determine which one or more other client devices 202 are within a physical proximity based on the received GPS coordinates from individual client devices 202.

In some implementations, the computing system 100 may determine a proximity group, for example, based on the one or more client devices 202 that (A) requested the file 108, (B) provided permission to download the file 108 using collaborative downloading, and (C) are within a physical proximity. The computing system 100 may divide the file 108 into a number of portions based on the number of client devices 202 in the proximity group. As shown in FIG. 1A, at an operation 126 of the routine 120, the computing system 100 may divide the file 108 into at least a first portion (to be sent to the first device 102) and a second portion (to be sent to the second device 104). The computing system 100 may encrypt the first portion and the second portion of the file 108, and may send a decryption key for use in decrypting the respective portions at least to the first device 102.

At an operation 128 of the routine 120, the computing system 100 may send the first portion of the file 108 to the first device 102. At an operation 130 of the routine 120, the computing system 100 may send the second portion of the file 108 to the second device 104. In some implementations, the computing system 100 may send to the first device 102 data to enable peer-to-peer communication between the first device 102 and the second device. For example, the computing system 100 may provide the first device 102 with instructions for establishing a Wi-Fi hotspot, with the instructions indicating the Wi-Fi hotspot name, the service set identifier (SSID) for the hotspot, and a password to be used to access the hotspot.

At an operation 132 of the routine 120, the computing system 100 may send data to the second device 104 to enable the second device 104 to establish a peer-to-peer communication with the first device 102 and enable a transfer of the second portion of the file 108 to the first device 102. For example, the data may include the Wi-Fi name and the password for connecting to the Wi-Fi hotspot of the first device 102.

In some implementations, the computing system 100 may receive additional requests for the file 108 from one or more other client devices 202. The computing system 100 may determine that such one or more other client devices 202 are not within proximity of the first device 102. Based on the determination that such other client device(s) 202 are not within proximity of the first device 102, the computing system 100 may send the entirety of the file 108 to those client devices 202, rather than involving those other devices in the collaborative downloading of the file 108 by the first device 102 and the second device 104.

Figure 1B:
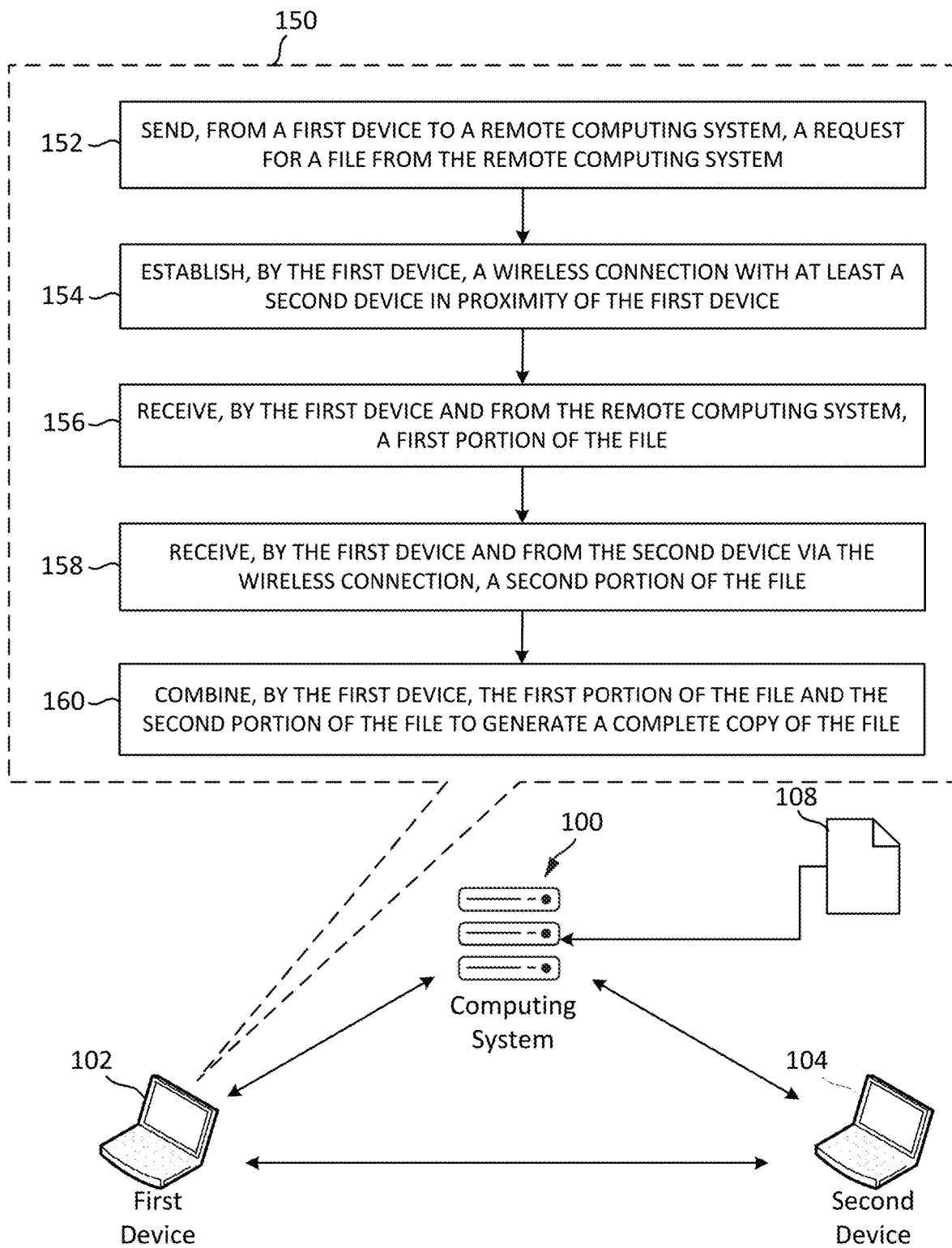
FIG. 1B is a high-level diagram illustrating a host device orchestrating a collaborative download of a file for one or more client devices within a proximity, in accordance with some embodiments of the present disclosure.

FIG. 1B is a high-level diagram illustrating how a client device 202 (e.g., the first device 102) may orchestrate a collaborative download of a file 108 by multiple client devices 202 (e.g., by at least the first device 102 and the second device 104) within a proximity of one another, in accordance with some embodiments of the present disclosure. As shown in FIG. 1B, at an operation 152 of the routine 150, the first device 102 may send to the computing system 100 a request for the file 108 from the computing system 100. As noted above, in some implementations, the computing system 100 may be a part of the file sharing system 504 (shown in FIGS. 5A-C), and the file 108 may be stored in the storage system 508.

In some implementations, the first device 102 may determine that at least the second device 104 is within a proximity of the first device 102. In some implementations, the determination that the second device 104 is within a proximity of the first device 102 may be in response to the first device 102 detecting a Bluetooth transmission identifying the second device 104. In some implementations, the first device 102 may send to the computing system 100 an indication that the second device 104 is within the proximity of the first device 102.

At an operation 154 of the routine 150, the first device 102 may establish a wireless connection with at least the second device 104. For example, as noted above, in some implementations, the first device 102 may receive instructions from the computing system 100 to establish a Wi-Fi hotspot, and the computing system 100 may additionally send to the second device 104 instructions for connecting to that hotspot. Accordingly, in such implementations, the first device 102 may establish a wireless connection with the second device 104 as a result of the second device 104 connecting to the Wi-Fi hotspot established by the first device 102.

At an operation 156 of the routine 150, the first device 102 may receive a first portion of the file 108 from the computing system 100. The second device 104 may receive a second portion of the file 108 from the computing system 100. At an operation 158 of the routine 150, the first device 102 may receive the second portion of the file 108 from the second device 104 via the wireless connection, such as via the Wi-Fi hotspot of the first device 102.

At an operation 160 of the routine 150, the first device 102 may combine the first portion of the file 108 and the second portion of the file 108 to generate a complete copy of the file 108. In some implementations, the first device 102 may decrypt the respective portions of the file 108 (e.g., using a decryption key received from the computing system 100) prior to generating the complete copy of the file 108. In some implementations, the first device 102 may send to the second device 104 the complete copy of the file 108 via the wireless connection. In other implementations, the first device 102 may instead send the first portion of the file 108 to the second device 104 via the wireless connection, to allow the second device 104 to combine the first portion of the file 108 with the second portion of the file 108 to thus generate a complete copy of the file 108 for use by the second device 104. In such implementations, the second device 104 may also receive a decryption key from the computing system 100 for use in decrypting the respective portions of the file 108.

Additional details and example implementations of embodiments of the present disclosure are set forth below in Section F, following a description of example systems and network environments in which such embodiments may be deployed.

B. Network Environment

Figure 2:
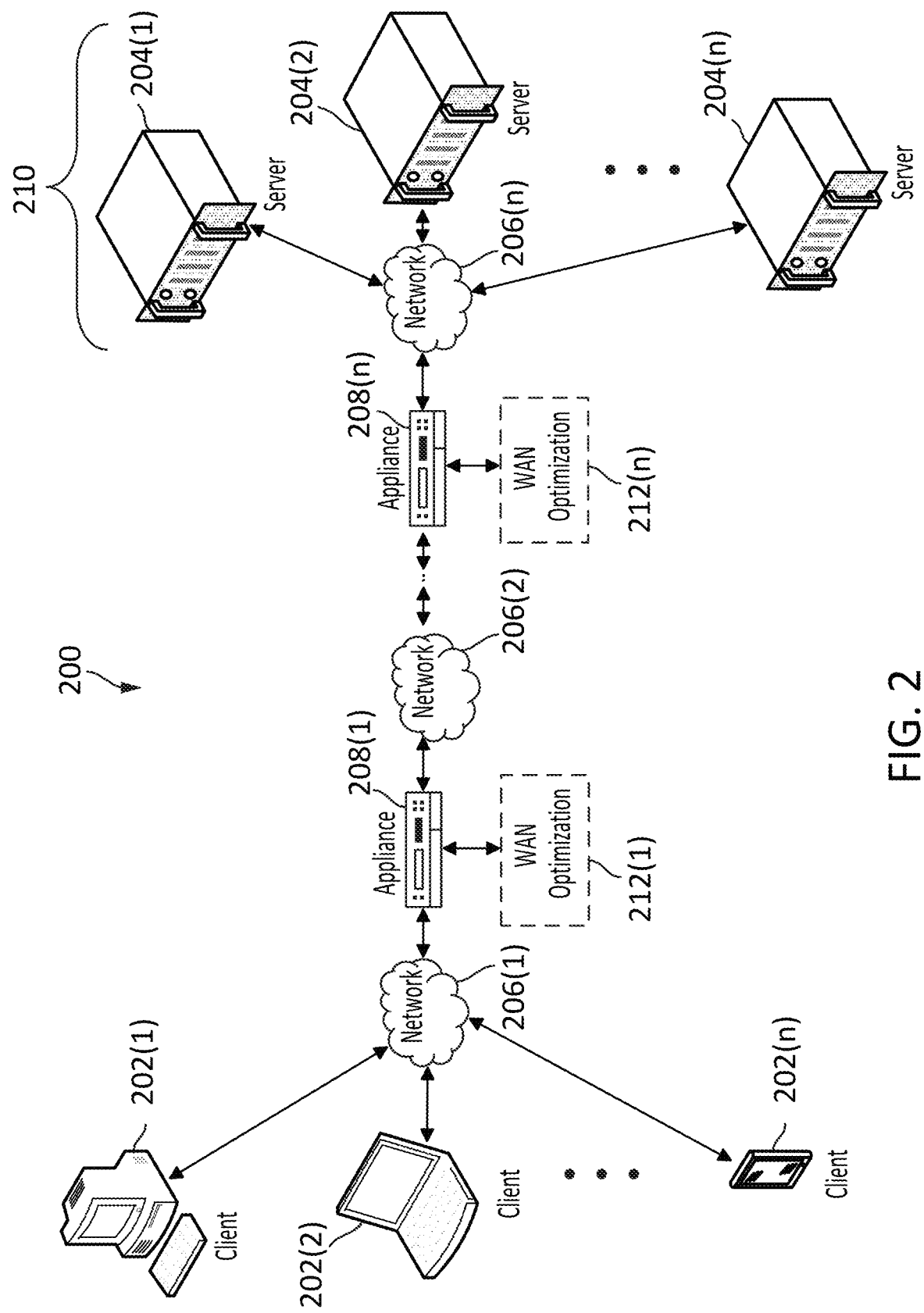
FIG. 2 is a diagram of a network environment in which some embodiments of the present disclosure may be deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of an organization.

C. Computing Environment

Figure 3:
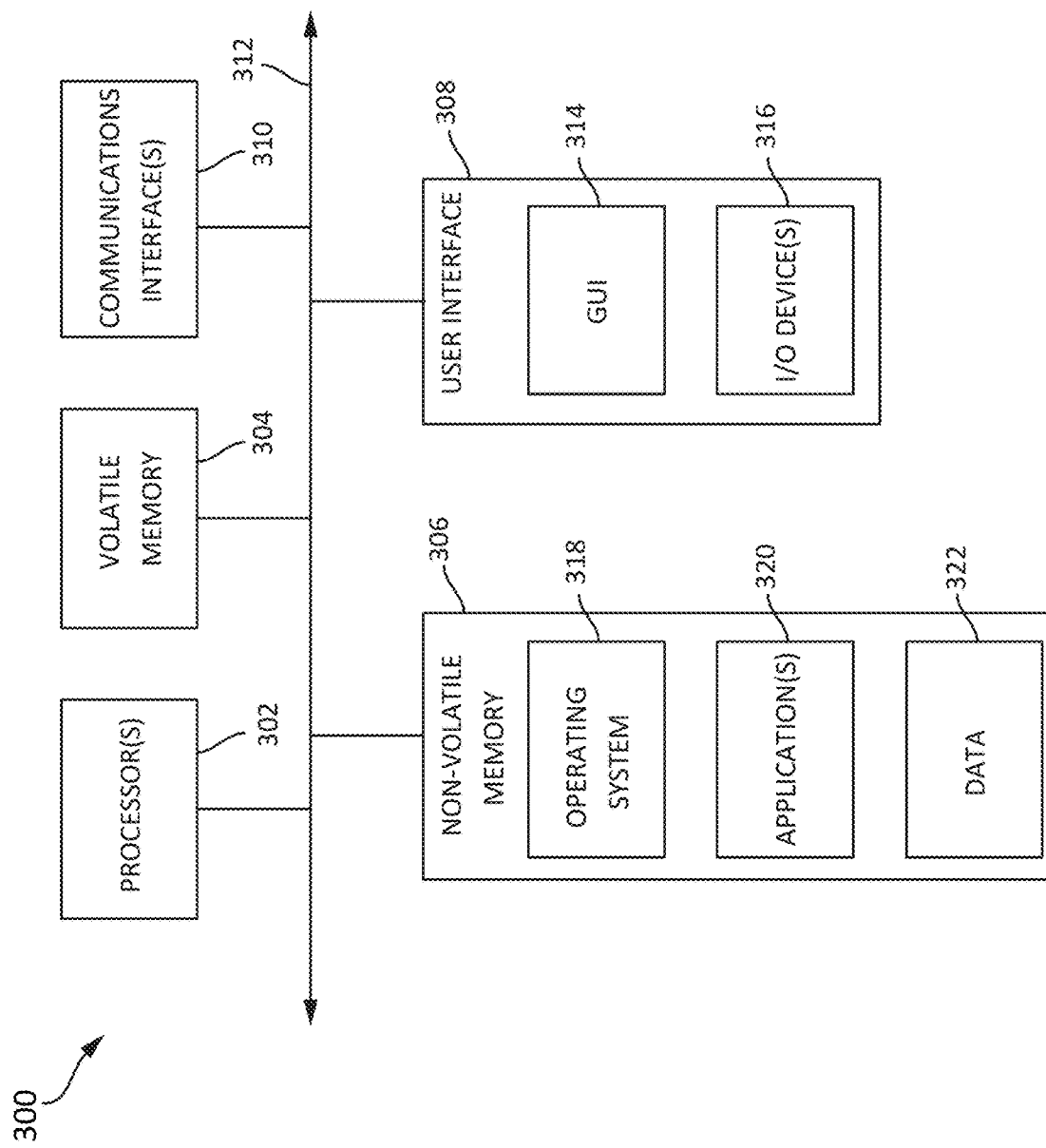
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
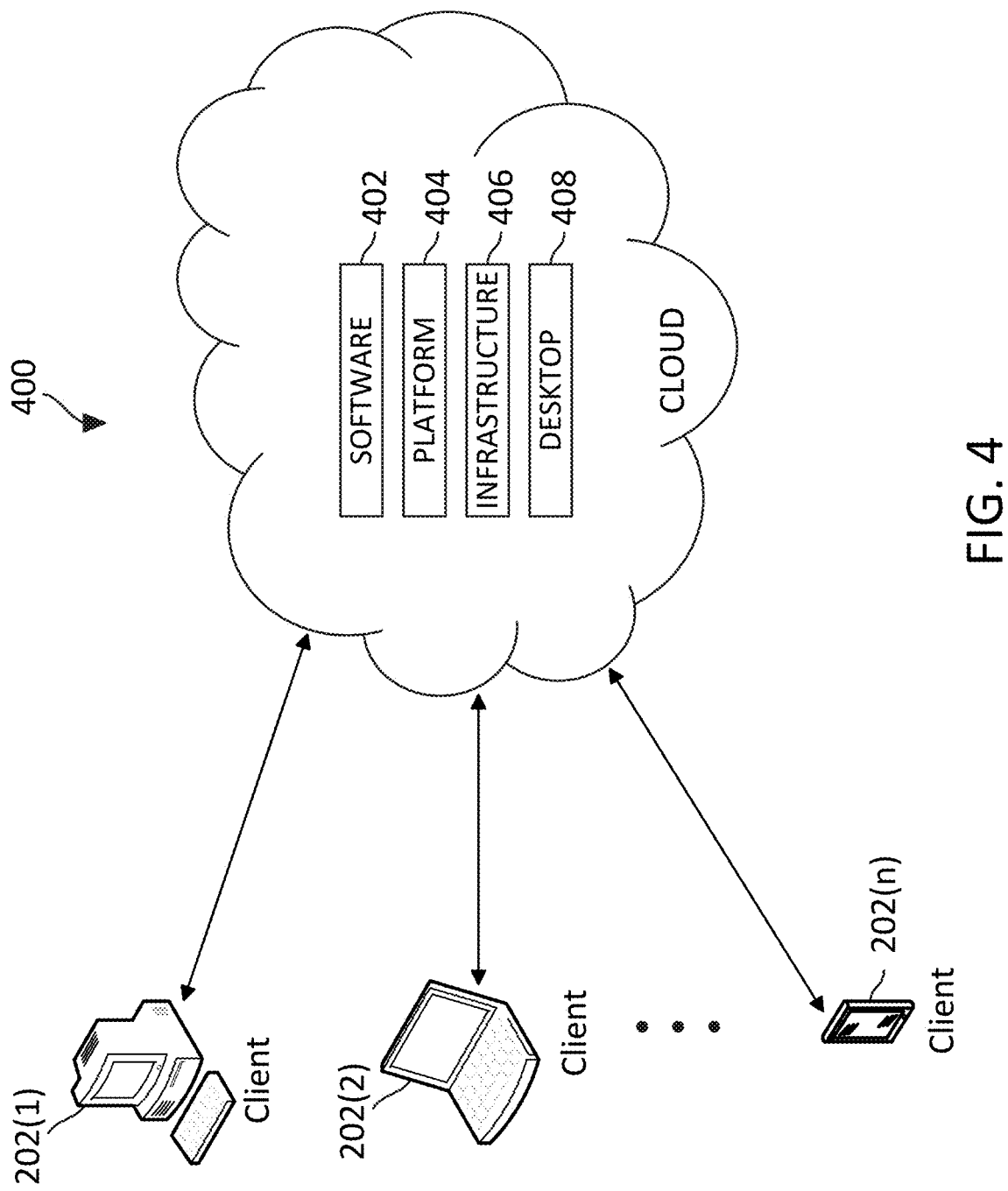
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile® from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Providing File Sharing Over Network(s)

FIG. 5A shows an example network environment 500 for allowing an authorized client 202a and/or an unauthorized client 202b to upload a file 502 to a file sharing system 504 or download a file 502 from the file sharing system 504. The authorized client 202a may, for example, be a client 202 operated by a user having an active account with the file sharing system 504, while the unauthorized client 202b may be operated by a user who lacks such an account. As shown, in some embodiments, the authorized client 202a may include a file management application 513 with which a user of the authorized client 202a may access and/or manage the accessibility of one or more files 502 via the file sharing system 504. The file management application 513 may, for example, be a mobile or desktop application installed on the authorized client 202a (or in a computing environment accessible by the authorized client). The ShareFile® mobile app and the ShareFile® desktop app offered by Citrix Systems, Inc., of Fort Lauderdale, Fla., are examples of such preinstalled applications. In other embodiments, rather than being installed on the authorized client 202a, the file management application 513 may be executed by a web server (included with the file sharing system 504 or elsewhere) and provided to the authorized client 202a via one or more web pages.

As FIG. 5A illustrates, in some embodiments, the file sharing system 504 may include an access management system 506 and a storage system 508. As shown, the access management system 506 may include one or more access management servers 204a and a database 510, and the storage system 508 may include one or more storage control servers 204b and a storage medium(s) 512. In some embodiments, the access management server(s) 204a may, for example, allow a user of the file management application 513 to log in to his or her account, e.g., by entering a user name and password corresponding to account data stored in the database 510. Once the user of the client 202a has logged in, the access management server 204a may enable the user to view (via the authorized client 202a) information identifying various folders represented in the storage medium(s) 512, which is managed by the storage control server(s) 204b, as well as any files 502 contained within such folders. File/folder metadata stored in the database 510 may be used to identify the files 502 and folders in the storage medium(s) 512 to which a particular user has been provided access rights.

In some embodiments, the clients 202a, 202b may be connected to one or more networks 206a (which may include the Internet), the access management server(s) 204a may include webservers, and an appliance 208a may load balance requests from the authorized client 202a to such webservers. The database 510 associated with the access management server(s) 204a may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202a, 202b are shown is FIG. 5A as stand-alone computers, it should be appreciated that one or both of the clients 202a, 202b shown in FIG. 5A may instead represent other types of computing devices or systems that can be operated by users. In some embodiments, for example, one or both of the authorized client 202a and the unauthorized client 202b may be implemented as a server-based virtual computing environment that can be remotely accessed using a separate computing device operated by users, such as described above.

In some embodiments, the access management system 506 may be logically separated from the storage system 508, such that files 502 and other data that are transferred between clients 202 and the storage system 508 do not pass through the access management system 506. Similar to the access management server(s) 204a, one or more appliances 208b may load-balance requests from the clients 202a, 202b received from the network(s) 206a (which may include the Internet) to the storage control server(s) 204b. In some embodiments, the storage control server(s) 204b and/or the storage medium(s) 512 may be hosted by a cloud-based service provider (e.g., Amazon Web Services™ or Microsoft Azure™). In other embodiments, the storage control server(s) 204b and/or the storage medium(s) 512 may be located at a data center managed by an enterprise of a client 202, or may be distributed among some combination of a cloud-based system and an enterprise system, or elsewhere.

After a user of the authorized client 202a has properly logged in to an access management server 204a, the server 204a may receive a request from the client 202a for access to one of the files 502 or folders to which the logged in user has access rights. The request may either be for the authorized client 202a to itself to obtain access to a file 502 or folder or to provide such access to the unauthorized client 202b. In some embodiments, in response to receiving an access request from an authorized client 202a, the access management server 204a may communicate with the storage control server(s) 204b (e.g., either over the Internet via appliances 208a and 208b or via an appliance 208c positioned between networks 206b and 206c) to obtain a token generated by the storage control server 204b that can subsequently be used to access the identified file 502 or folder.

In some implementations, the generated token may, for example, be sent to the authorized client 202a, and the authorized client 202a may then send a request for a file 502, including the token, to the storage control server(s) 204b. In other implementations, the authorized client 202a may send the generated token to the unauthorized client 202b so as to allow the unauthorized client 202b to send a request for the file 502, including the token, to the storage control server(s) 204b. In yet other implementations, an access management server 204a may, at the direction of the authorized client 202a, send the generated token directly to the unauthorized client 202b so as to allow the unauthorized client 202b to send a request for the file 502, including the token, to the storage control server(s) 204b. In any of the forgoing scenarios, the request sent to the storage control server(s) 204b may, in some embodiments, include a uniform resource locator (URL) that resolves to an internet protocol (IP) address of the storage control server(s) 204b, and the token may be appended to or otherwise accompany the URL. Accordingly, providing access to one or more clients 202 may be accomplished, for example, by causing the authorized client 202a to send a request to the URL address, or by sending an email, text message or other communication including the token-containing URL to the unauthorized client 202b, either directly from the access management server(s) 204a or indirectly from the access management server(s) 204a to the authorized client 202a and then from the authorized client 202a to the unauthorized client 202b. In some embodiments, selecting the URL or a user interface element corresponding to the URL, may cause a request to be sent to the storage control server(s) 204b that either causes a file 502 to be downloaded immediately to the client that sent the request, or may cause the storage control server 204b to return a webpage to the client that includes a link or other user interface element that can be selected to effect the download.

In some embodiments, a generated token can be used in a similar manner to allow either an authorized client 202a or an unauthorized client 202b to upload a file 502 to a folder corresponding to the token. In some embodiments, for example, an "upload" token can be generated as discussed above when an authorized client 202a is logged in and a designated folder is selected for uploading. Such a selection may, for example, cause a request to be sent to the access management server(s) 204a, and a webpage may be returned, along with the generated token, that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In some embodiments, sending a request including such a token to the storage control server(s) 204b (e.g., by selecting a URL or user-interface element included in an email inviting the user to upload one or more files 502 to the file sharing system 504), a webpage may be returned that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In the described embodiments, the clients 202, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may correspond to respective computing systems, groups of computing systems, or networks of distributed computing systems, such as computing system 300 shown in FIG. 3.

As discussed above in connection with FIG. 5A, in some embodiments, a file sharing system may be distributed between two sub-systems, with one subsystem (e.g., the access management system 506) being responsible for controlling access to files 502 stored in the other subsystem (e.g., the storage system 508). FIG. 5B illustrates conceptually how one or more clients 202 may interact with two such subsystems.

As shown in FIG. 5B, an authorized user operating a client 202, which may take on any of numerous forms, may log in to the access management system 506, for example, by entering a valid user name and password. In some embodiments, the access management system 506 may include one or more webservers that respond to requests from the client 202. The access management system 506 may store metadata concerning the identity and arrangements of files 502 (shown in FIG. 5A) stored by the storage system 508, such as folders maintained by the storage system 508 and any files 502 contained within such folders. In some embodiments, the metadata may also include permission metadata identifying the folders and files 502 that respective users are allowed to access. Once logged in, a user may employ a user-interface mechanism of the client 202 to navigate among folders for which the metadata indicates the user has access permission.

In some embodiments, the logged-in user may select a particular file 502 the user wants to access and/or to which the logged-in user wants a different user of a different client 202 to be able to access. Upon receiving such a selection from a client 202, the access management system 506 may take steps to authorize access to the selected file 502 by the logged-in client 202 and/or the different client 202. In some embodiments, for example, the access management system 506 may interact with the storage system 508 to obtain a unique "download" token which may subsequently be used by a client 202 to retrieve the identified file 502 from the storage system 508. The access management system 506 may, for example, send the download token to the logged-in client 202 and/or a client 202 operated by a different user. In some embodiments, the download token may a single-use token that expires after its first use.

In some embodiments, the storage system 508 may also include one or more webservers and may respond to requests from clients 202. In such embodiments, one or more files 502 may be transferred from the storage system 508 to a client 202 in response to a request that includes the download token. In some embodiments, for example, the download token may be appended to a URL that resolves to an IP address of the webserver(s) of the storage system 508. Access to a given file 502 may thus, for example, be enabled by a "download link" that includes the URL/token. Such a download link may, for example, be sent the logged-in client 202 in the form of a "DOWNLOAD" button or other user-interface element the user can select to effect the transfer of the file 502 from the storage system 508 to the client 202. Alternatively, the download link may be sent to a different client 202 operated by an individual with which the logged-in user desires to share the file 502. For example, in some embodiments, the access management system 506 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 506 and cut-and-paste or otherwise copy the download link into an email or other message the logged in user can then send to the other client 202 to enable the other client 202 to retrieve the file 502 from the storage system 508.

In some embodiments, a logged-in user may select a folder on the file sharing system to which the user wants to transfer one or more files 502 (shown in FIG. 5A) from the logged-in client 202, or to which the logged-in user wants to allow a different user of a different client 202 to transfer one or more files 502. Additionally or alternatively, the logged-in user may identify one or more different users (e.g., by entering their email addresses) the logged-in user wants to be able to access one or more files 502 currently accessible to the logged-in client 202.

Similar to the file downloading process described above, upon receiving such a selection from a client 202, the access management system 506 may take steps to authorize access to the selected folder by the logged-in client 202 and/or the different client 202. In some embodiments, for example, the access management system 506 may interact with the storage system 508 to obtain a unique "upload token" which may subsequently be used by a client 202 to transfer one or more files 502 from the client 202 to the storage system 508. The access management system 506 may, for example, send the upload token to the logged-in client 202 and/or a client 202 operated by a different user.

One or more files 502 may be transferred from a client 202 to the storage system 508 in response to a request that includes the upload token. In some embodiments, for example, the upload token may be appended to a URL that resolves to an IP address of the webserver(s) of the storage system 508. For example, in some embodiments, in response to a logged-in user selecting a folder to which the user desires to transfer one or more files 502 and/or identifying one or more intended recipients of such files 502, the access management system 506 may return a webpage requesting that the user drag-and-drop or otherwise identify the file(s) 502 the user desires to transfer to the selected folder and/or a designated recipient. The returned webpage may also include an "upload link," e.g., in the form of an "UPLOAD" button or other user-interface element that the user can select to effect the transfer of the file(s) 502 from the client 202 to the storage system 508.

In some embodiments, in response to a logged-in user selecting a folder to which the user wants to enable a different client 202 operated by a different user to transfer one or more files 502, the access management system 506 may generate an upload link that may be sent to the different client 202. For example, in some embodiments, the access management system 506 may send an email or other message to the different client 202 that includes a message indicating that the different user has been authorized to transfer one or more files 502 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 502 the different user wishes to upload to the file sharing system 504. The returned webpage may also include a user-interface element, e.g., in the form of an "UPLOAD" button, that the different user can select to effect the transfer of the file(s) 502 from the client 202 to the storage system 508. In other embodiments, the logged-in user may receive the upload link from the access management system 506 and may cut-and-paste or otherwise copy the upload link into an email or other message the logged-in user can then send to the different client 202 to enable the different client to upload one or more files 502 to the storage system 508.

In some embodiments, in response to one or more files 502 being uploaded to a folder, the storage system 508 may send a message to the access management system 506 indicating that the file(s) 502 have been successfully uploaded, and an access management system 506 may, in turn, send an email or other message to one or more users indicating the same. For user's that have accounts with the file sharing system 504, for example, a message may be sent to the account holder that includes a download link that the account holder can select to effect the transfer of the file 502 from the storage system 508 to the client 202 operated by the account holder. Alternatively, the message to the account holder may include a link to a webpage from the access management system 506 inviting the account holder to log in to retrieve the transferred files 502. Likewise, in circumstances in which a logged-in user identifies one or more intended recipients for one or more to-be-uploaded files 502 (e.g., by entering their email addresses), the access management system 506 may send a message including a download link to the designated recipients (e.g., in the manner described above), which such designated recipients can then use to effect the transfer of the file(s) 502 from the storage system 508 to the client(s) 202 operated by those designated recipients.

FIG. 5C is a block diagram showing an example of a process for generating access tokens (e.g., the upload tokens and download tokens discussed above) within the file sharing system 504 described in connection with FIGS. 5A and 5B.

As shown, in some embodiments, a logged-in client 202 may initiate the access token generation process by sending an access request 514 to the access management server(s) 204b. As noted above, the access request 514 may, for example, correspond to one or more of (A) a request to enable the downloading of one or more files 502 (shown in FIG. 5A) from the storage system 508 to the logged-in client 202, (B) a request to enable the downloading of one or more files 502 from the storage system 508 to a different client 202 operated by a different user, (C) a request to enable the uploading of one or more files 502 from a logged-in client 202 to a folder on the storage system 508, (D) a request to enable the uploading of one or more files 502 from a different client 202 operated by a different user to a folder of the storage system 508, (E) a request to enable the transfer of one or more files 502, via the storage system 508, from a logged-in client 202 to a different client 202 operated by a different user, or (F) a request to enable the transfer of one or more files 502, via the storage system 508, from a different client 202 operated by a different user to a logged-in client 202.

In response to receiving the access request 514, an access management server 204a may send a "prepare" message 516 to the storage control server(s) 204b of the storage system 508, identifying the type of action indicated in the request, as well as the identity and/or location within the storage medium(s) 512 of any applicable folders and/or files 502. As shown, in some embodiments, a trust relationship may be established (step 518) between the storage control server(s) 204b and the access management server(s) 204a. In some embodiments, for example, the storage control server(s) 204b may establish the trust relationship by validating a hash-based message authentication code (HMAC) based on shared secret or key 530).

After the trust relationship has been established, the storage control server(s) 204b may generate and send (step 520) to the access management server(s) 204a a unique upload token and/or a unique download token, such as those discussed above.

After the access management server(s) 204a receive a token from the storage control server(s) 204b, the access management server(s) 204a may prepare and send a link 522 including the token to one or more client(s) 202. In some embodiments, for example, the link may contain a fully qualified domain name (FQDN) of the storage control server(s) 204b, together with the token. As discussed above, the link 522 may be sent to the logged-in client 202 and/or to a different client 202 operated by a different user, depending on the operation that was indicated by the request.

The client(s) 202 that receive the token may thereafter send a request 524 (which includes the token) to the storage control server(s) 204b. In response to receiving the request, the storage control server(s) 204b may validate (step 526) the token and, if the validation is successful, the storage control server(s) 204b may interact with the client(s) 202 to effect the transfer (step 528) of the pertinent file(s) 502, as discussed above.

F. Detailed Description of Example Embodiments of a System for Efficient Downloading Files to Multiple Devices Within a Proximity As described above in Section A, at a high level, the computing system 100 (shown in FIGS. 1A and 1B) may receive requests from multiple client devices 202, such as the first device 102 and the second device 104, for a file (e.g., the file 108 shown in FIGS. 1A and 1B). The computing system 100 may determine multiple client devices 202 are within a physical proximity of one another and may transmit different data portions (referred to herein as "chunks") of the file 108 to the individual client devices 202 of the multiple client devices 202. The computing system 100 may provide access and/or connection data to the multiple client devices 202 to enable peer-to-peer sharing of the distributed data chunks amongst those client devices 202. In some implementations, at least one client device 202 may use the data chunks it receives from the other client device(s) 202 to reconstruct a complete copy of the file 108, and may then distribute that complete copy of the file 108 to the other client device(s) 202 participating in the collaborative download. In other implementations, the individual client devices 202 may be responsible for receiving the data chunks downloaded to the other client device(s) 202, and then combining those received chunks to construct their own complete copies of the file 108.

Figure 6A:
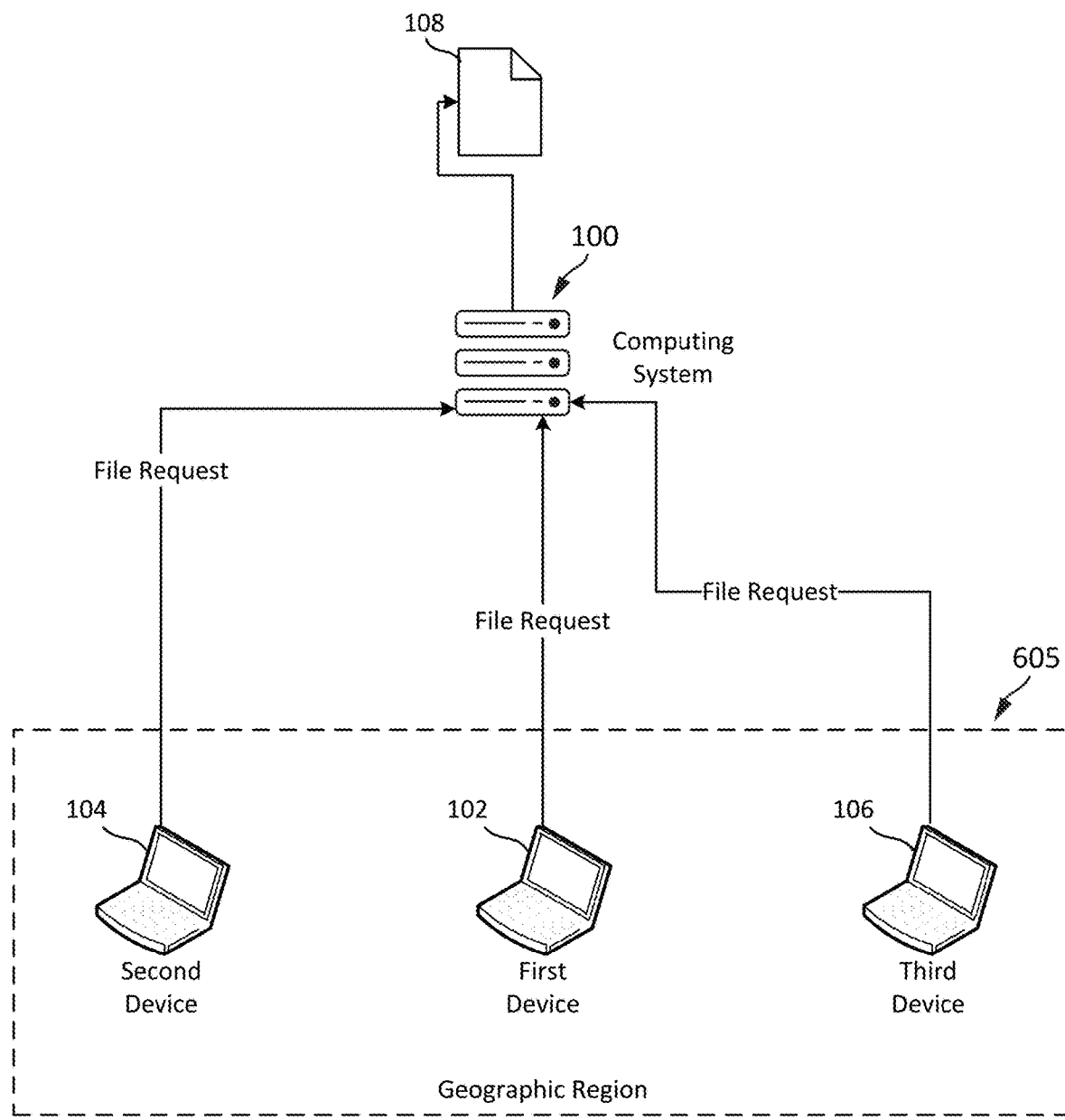
FIG. 6A illustrates a first step of an example process for collaboratively downloading a file from a computing system to multiple client devices within a proximity, in accordance with some embodiments.

FIGS. 6A-6D illustrate an example process for collaboratively downloading a file 108 to multiple client devices 202 (e.g., the first device 102, the second device 104, and a third device 106) within a proximity of one another, in accordance with some embodiments. Although three such client devices 202 are shown in FIGS. 6A-6D, it should be appreciated that additional or fewer client devices 202 may be employed in some circumstances. As shown in FIG. 6A, in some implementations, the computing system 100 may receive respective requests for the file 108 from the multiple client devices 202 (e.g., the first device 102, the second device 104, and the third device 106). As noted above, in some embodiments, the computing system 100 may be part of the file sharing system 504 described in Section E. A user of a client device 202, such as the first device 102, may operate the client device 202 to request the file 108 or set of files from a file server, such as the computing system 100. The first device 102 may use a client application, such as the ShareFile® mobile application or the ShareFile® desktop application offered by Citrix Systems, Inc., to request files from the computing system 100. In some implementations, upon registration of the client application with a client device 202, such as the first device 102, the client application may request and obtain permission to access the Bluetooth functionalities of the client device 202. The client application may collect device-specific information, such as a unique device identifier, the Media Access Control (MAC) address of the device, and possibly additional or different information for networking and/or communication. In some implementations, the device-specific information may be sent to the computing system 100 and stored, such as within the storage system 508 of the file sharing system 504.

In some implementations, in response to receiving a user input requesting the downloading of a file, the client application may prompt the user for approval to take steps to identify other client devices 202 that are capable of participating in a collaborative downloading process for the requested file. For example, the client application of the first device 102 may display the prompt "Identify nearby devices for collaborative downloading?" and request either a "Yes" or a "No" response. In response to the user agreeing to take such steps, e.g., by providing a "Yes" response, the client application of the first device 102 may access a short range wireless radio of the first device 102, such as a Bluetooth or Wi-Fi transceiver, to identify one or more other devices, such as the second device 104 and the third device 106, which may be within a physical proximity of the first device 102. In some implementations, the first device 102 may transmit data identifying the one or more devices detected within the proximity of the first device 102, such as a Bluetooth name or MAC address of the one or more other devices, to the computing system 100. In other implementations, the first device 102 may additionally or alternatively transmit the geographic location, such as GPS coordinates, of the first device 102 to the computing system 100. In either case, the data may be transmitted to the computing system 100 shortly before the file request, together with the file request, or shortly after the file request. In some implementations, such data concerning individual client devices 202 may be encrypted before it is sent to the computing system 100.

In some implementations, the foregoing file request process may be repeated for one or more client devices 202 requesting the file 108. The computing system 100 may then determine a group and/or subset of client devices 202 which have requested the file 108 within a time period and are within a physical and/or geographic proximity of one another. This group and/or subset of client devices 202 may be referred to as a "proximity group." For example, as shown in FIG. 6A, the computing system 100 may determine that the first device 102, the second device 104, and the third device 106 have sent requests for the file 108 and are located within the same geographic region 605 or are otherwise in close enough proximity to engage in wireless communication with one another. In some implementations, the computing system 100 may identify the group and/or subset of client devices 202 that are to be invited to participate in collaborative file downloading based on the temporal proximity of the file requests that are received. In some implementations, for example, the computing system 100 may invite two geographically proximate client devices 202 to participate in collaborative downloading of a file only if those two client devices 202 submitted their respective requests for the file 108 within a particular time period, e.g., within thirty seconds of one another. Such a time period for receiving file requests may be adjusted based on factors such as the number of anticipated requests for the same file at a given time. In some implementations, the time period may be increased as additional file requests are received, until an identified limit, such as a number of requests or maximum time period, is reached.

In some implementations, the computing system 100 may receive requests for the file 108 from one or more locations. The computing system 100 may determine one or more subsets of client devices 202 for the different locations that include a plurality of client devices 202 within a physical proximity of one another. For example, a company may be conducting an online presentation to their three offices located in Boston, Minneapolis, and Phoenix. The employees at the locations may attempt to download the presentation materials from the computing system 100 or file sharing system 504. Based on the received device proximity data, the computing system 100 may determine three different proximity groups, such as a first proximity group for Boston, a second proximity group for Minneapolis, and a third proximity group for Phoenix.

In some implementations, upon identifying a suitable proximity group for a client device 202 that has requested the file 108 (e.g., the first device 102), the computing system 100 may send identifiers of the other client devices 202 and/or users operating such devices in that proximity group to the requesting client device 202 (e.g., the first device 102). In response to receiving such identifiers, the client application of the requesting client device 202 may display indication(s) of the identified client devices 202 and/or the users of those devices, and may output an additional prompt requesting approval to participate in collaborative downloading of the file 108 with the identified client devices 202 and/or users. In some implementations, the displayed indications may include identifiers/names of respective devices and/or users. In other implementations, the displayed indication(s) may simply identify a quantity of nearby client devices 202 and/or users who have been identified as potential participants in the collaborative downloading process. Further, in some implementations, the client application may present one or more user interface elements (e.g., checkboxes) enabling the user to select one or more particular devices and/or users which/whom the user is willing to collaboratively download the file 108, and/or to select one or more particular devices and/or users which/whom the user is unwilling to collaboratively download the file 108. In any event, the user may respond to the provided prompt by either approving the collaborative downloading of the file 108 with the indicated devices/users (or quantity of devices/users), or disapproving use of the collaborative downloading process with such devices/users. Upon receiving the user's response to the prompt, the client application of the client device may send an indication of the response to the computing system 100. In some implementations, a similar process may be performed by the client applications of the other client devices 202 included in the identified proximity group. As a result, the computing system 100 may receive responses from the respective client devices in the identified proximity group, either approving or disapproving use of the collaborative downloading process with the other client devices 202 in the proximity group.

Figure 6B:
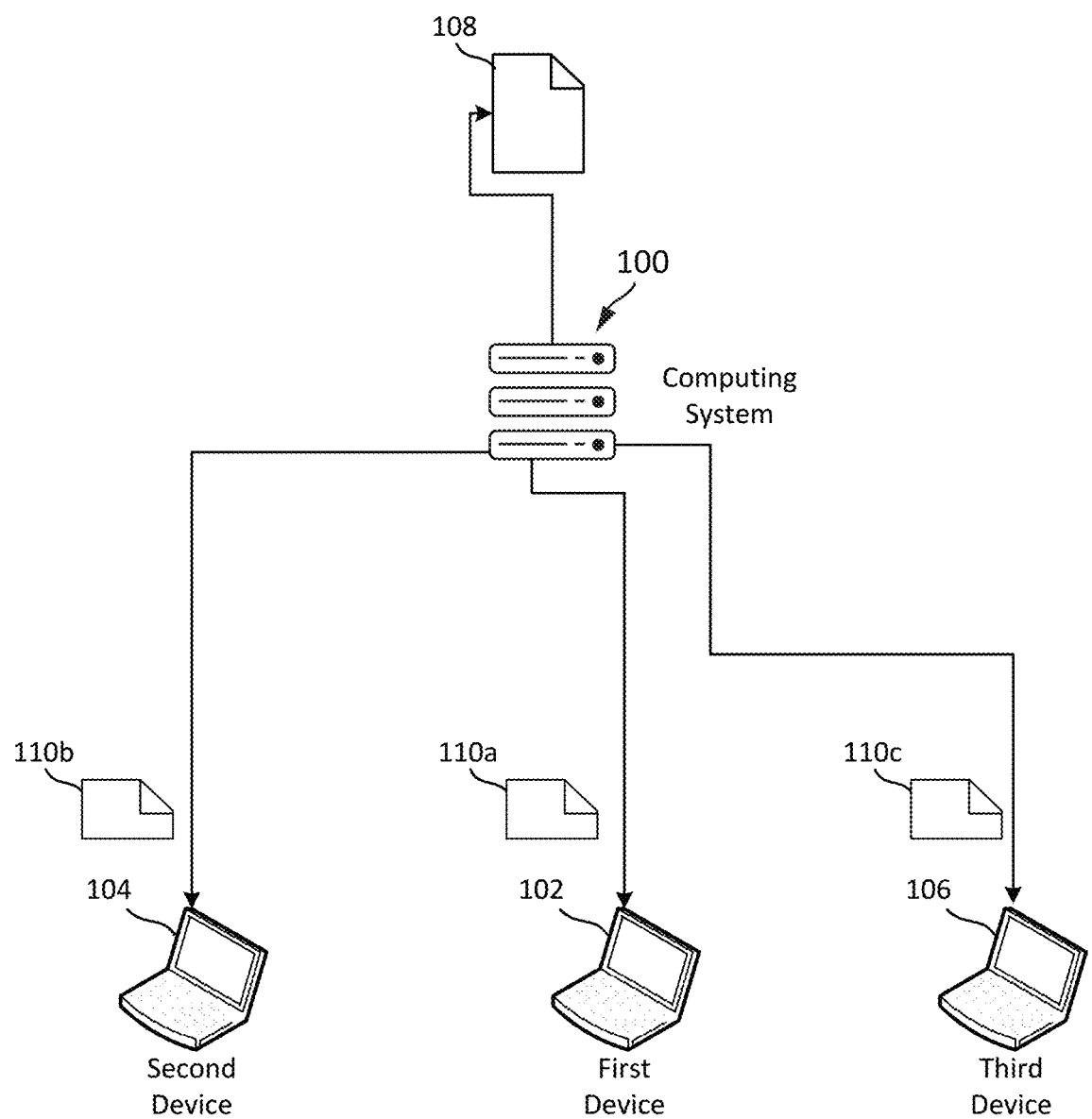
FIG. 6B illustrates a second step of an example process for collaboratively downloading a file from a computing system to multiple client devices within a proximity, in accordance with some embodiments.

In some implementations, upon receiving approval responses from some or all of the client devices 202 in a proximity group, the computing system 100 may determine to invoke a process for collaboratively downloading the file 108 to those client devices 202 that sent such responses. Referring to FIG. 6B, for instance, it may be assumed that such approval responses were received from the first device 102, the second device 104, and the third device 106. In some implementations, a client device 202 from the subset of client devices 202, or proximity group, may be identified as the "host" device, such as the first device 102. In some implementations, the computing system 100 may designate multiple devices from the proximity group as host devices. Utilizing multiple host devices for a proximity group may be, for example, based on the number of client devices 202 in the proximity group and/or the geographic size of the proximity group. In some implementations, the proximity group may be divided into sub-groups, for example, based on the number of client devices 202 within the proximity group. The computing system 100 may divide the file 108 into file into chunks, such as the file portions 110a, 110b, and 110c shown in FIG. 6B. The number of chunks may be based on the number of client devices 202 in the proximity group. In some implementations, the file portions may be encrypted by the computing system 100. In other implementations, the entirety of the file 108 may be encrypted by the computing system 100 prior to being divided into multiple chunks.

In some implementations, the computing system 100 may send different file portions to the respective client devices 202 in the proximity group (e.g., the first device 102, the second device 104, and the third device 106). For example, the first device 102 may receive the first file portion 110a, the second device 104 may receive the second file portion 110b, and the third device 106 may receive the third file portion 110c. In some implementations, the computing system 100 may send the other client devices 202 of the proximity group, through the client application, a decryption key for decrypting the respective portions of the file 108. In some implementations, such a decryption key may be sent only to the host device(s). In some implementations, the client application of individual client devices 202 may send an acknowledgement message to the computing system 100 upon receipt of its respective file chunk (e.g., the first file portion 110a, the second file portion 110b, or the third file portion 110c).

Figure 6C:
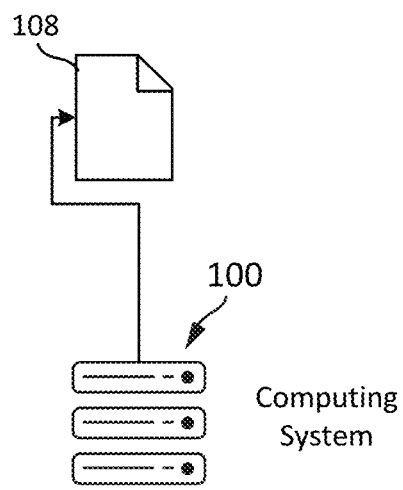
FIG. 6C illustrates a third step of an example process for collaboratively downloading a file from a computing system to multiple client devices within a proximity, in accordance with some embodiments.
Figure 6C:
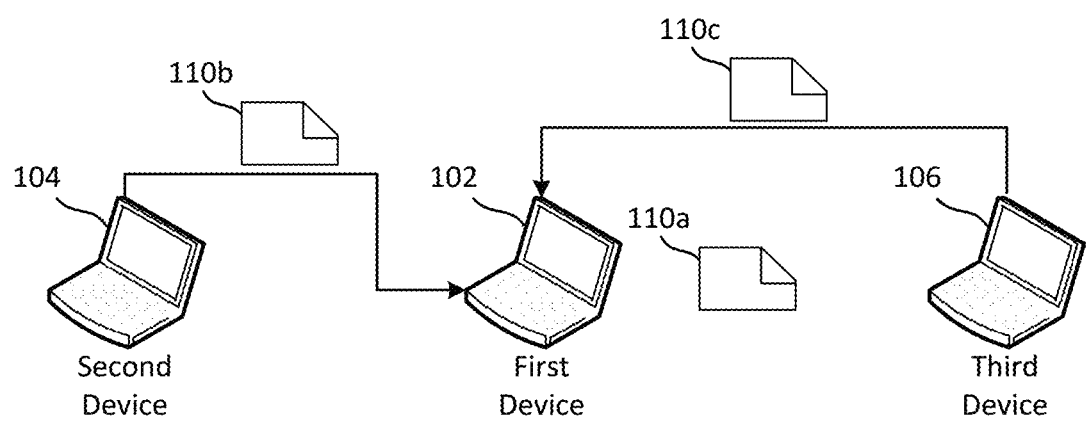

As shown in FIG. 6C, in some implementations, the non-host client devices 202 (e.g., the second device 104 and the third device 106) within the proximity group may send respective file portions (e.g., the file portions 110b and 110c) to the host device (e.g., the first device 102). In some implementations, to facilitate such sharing of the file portions 110 amongst the client devices 202, the computing system 100 may provide instructions to the client applications of the client devices 202 in the proximity group to establish one or more wireless communications links (e.g., via one or more wireless peer-to-peer connections) amongst those devices. For example, as described in more detail below, the computing system 100 may send instructions to the client application of the host device(s) (e.g., the first device 102) to create a Wi-Fi hotspot and may send instructions to the client applications of the non-host client device(s) 202 (e.g., the second device 104 and the third device 106) to connect to that Wi-Fi hotspot. In response to the one or more non-host client devices 202 of the proximity group, such as the second device 104 and the third device 106, receiving their respective file portions, such as the file portion 110b and the file portion 110c, the client application(s) of those non-host client device(s) 202 may establish connections with the host device(s) (e.g., the first device 102), such as by connecting to the Wi-Fi hotspot(s) created by the host device(s), and may send their respective file chunks to the host device(s) via such connections.

Figure 6D:
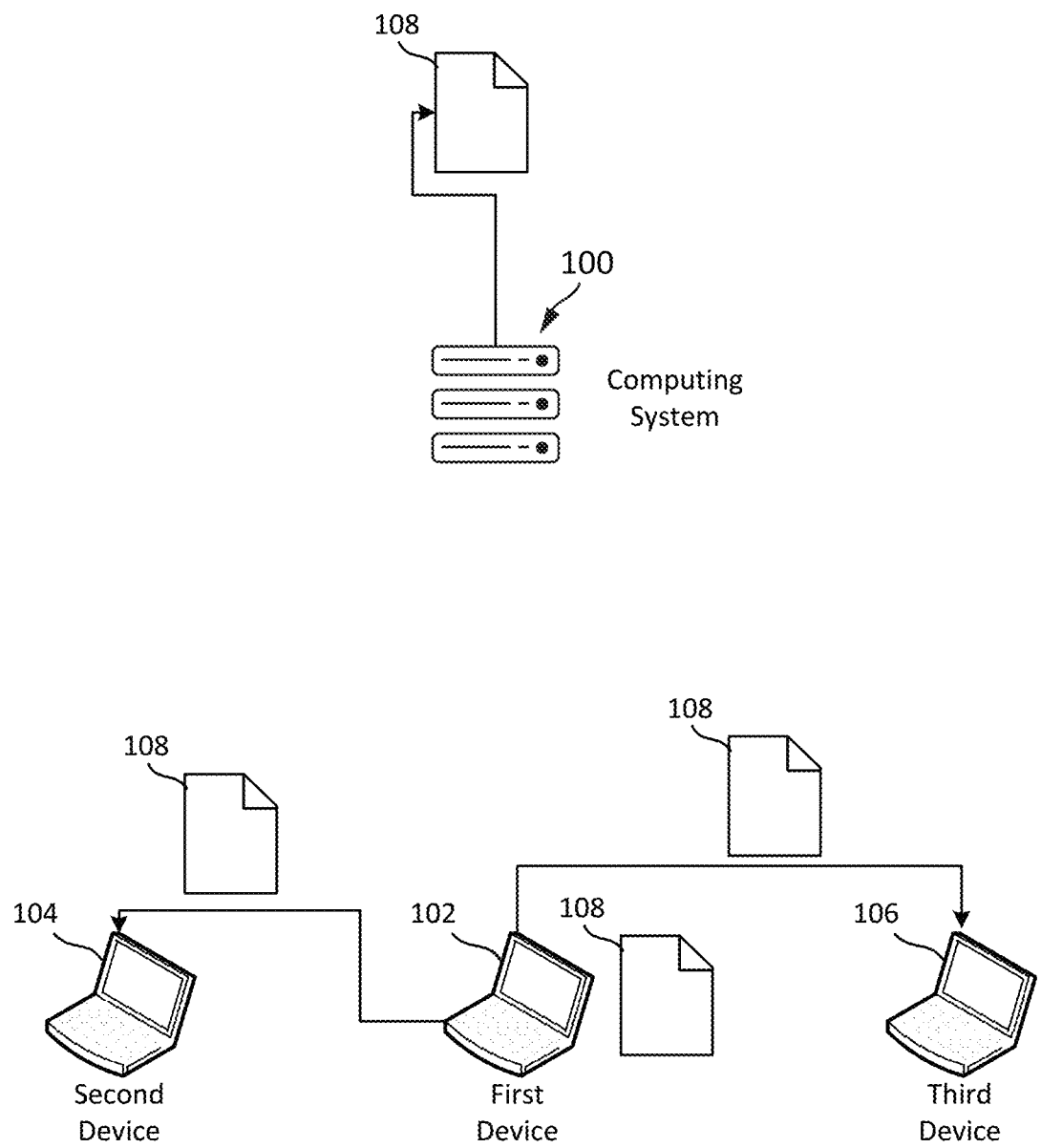
FIG. 6D illustrates a fourth step of an example process for collaboratively downloading a file from a computing system to multiple client devices within a proximity, in accordance with some embodiments.

After a host device (e.g., the first device 102) has received its own file chunk (e.g., the first file portion 110a) from the computing system 100 and has also received the file chunks (e.g., the file portions 110b and 110c) from the non-host client device(s) 202 in the proximity group (e.g., the second device 104 and the third device 106), the host device may merge the different file chunks (e.g., the first file portion 110a, the second file portion 110b, and the third file portion 110c) to reconstruct the file 108. As shown in FIG. 6D, in some implementations, the host device(s) (e.g., the first device 102) may send copies of the reconstructed file 108 to the non-host client devices 202 (e.g., the second device 104 and the third device 106) of the proximity group. In some implementations, the reconstructed file 108 may be stored on the host device(s) (e.g., the first device 102) and sent to the one or more non-host client devices 202 in the proximity group (e.g., the second device 104 and the third device 106) using the previously established wireless communication link, such as Wi-Fi.

In some implementations, if the entirety of the file 108 was encrypted by the computing system 100 prior to being divided into multiple chunks, the host device(s) (e.g., the first device 102) may first reassemble the encrypted chunks received from the other client devices 202 and then use a decryption key received from the computing system 100 to decrypt that assembly of encrypted chunks to yield the original file 108. The host device may then send the entirety of the file 108 to the other client devices 202, possibly encrypting the file 108 prior to distributing it to those other client devices 202. In other implementations, if the entirety of the file 108 was encrypted by the computing system 100 prior to being divided into multiple chunks, the host device may first reassemble the encrypted chunks received from the other client devices 202 and then distribute that assembly of chunks to the other client devices. In such implementations, the individual client devices 202 may then separately use a decryption key received from the computing system 100 to decrypt that assembly of encrypted chunks to yield the original file 108.

In yet other implementations, if the file chunks were separately encrypted by the computing system 100 prior to sending them to the respective client devices 202, the host device(s) (e.g., the first device 102) may use the decryption key received from the computing system 100 to decrypt respective chunks of the file (received from the computing system 100 and the other client devices 202), prior to merging the various chunks to reconstruct the file 108. The host device may then send the entirety of the file 108 to the other client devices 202, possibly encrypting the file 108 prior to distributing it to those other client devices 202. In still other implementations, if the file chunks were encrypted by the computing system 100 prior to sending them to the respective client devices 202, the individual non-host client device(s) 202 may use a decryption key received from the computing system 100 to decrypt their respective chunks of the file 108 (received from the computing system 100 and the other client devices 202), prior to sending them (possibly in an encrypted format) to the host device(s) for assembly into a complete copy of the file 108.

Figure 7A:
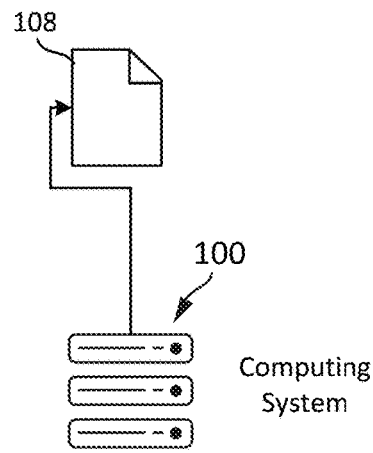
FIG. 7A illustrates an alternate implementation of the example step shown in FIG. 6C, in accordance with some embodiments.
Figure 7A:
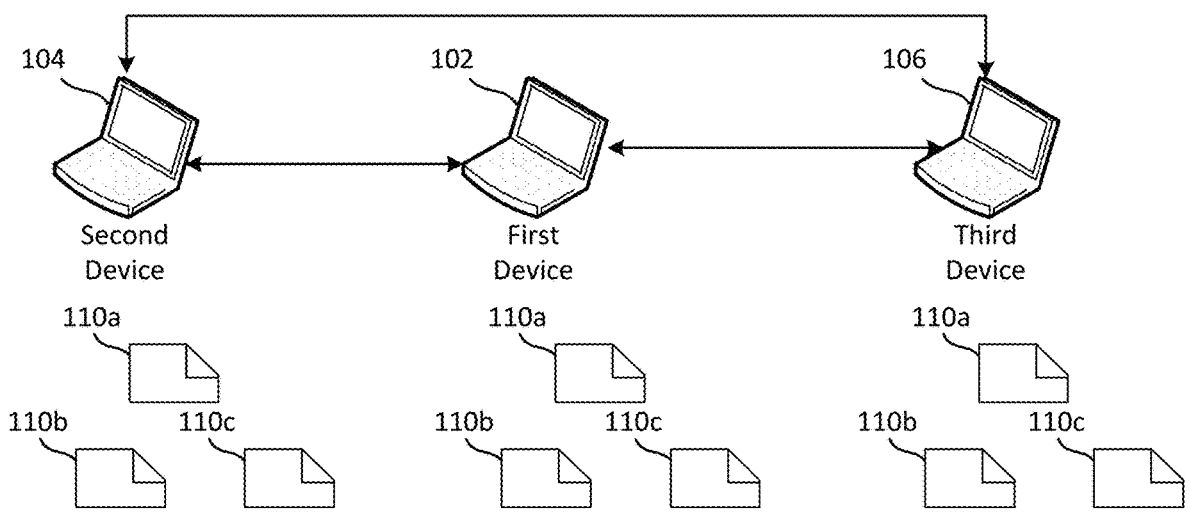
Figure 7B:
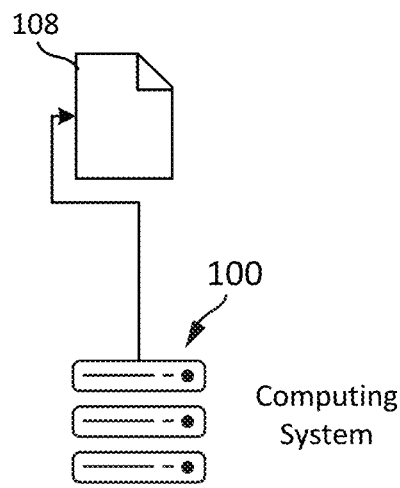
FIG. 7B illustrates an alternate implementation of the example step shown in FIG. 6D, in accordance with some embodiments.
Figure 7B:
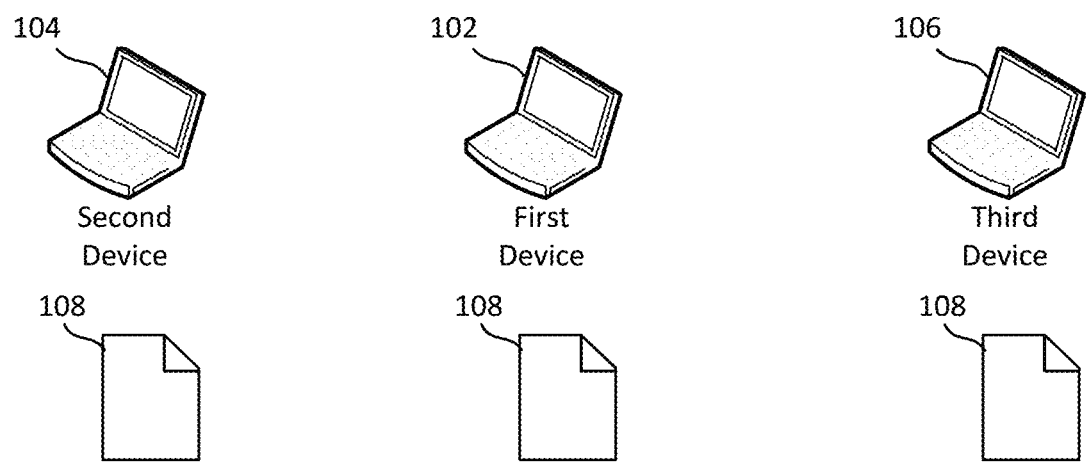

FIGS. 7A and 7B illustrate an example of an alternate implementation of the process shown in FIGS. 6C and 6D, respectively. As shown in FIG. 7A, in some implementations, individual ones of the client devices 202 (e.g., the first device 102, the second device 104, and the third device 106) within the proximity group may send the file chunk it received from the computing system 100 to the other client devices 202 of the proximity group. For instance, in the illustrated example, the first device 102 may send the first file portion 110a to both the second device 104 and the third device 106, the second device 104 may send the second file portion 110b to both the first device 102 and the third device 106, and the third device 106 may send the third file portion 110c to both the first device 102 and the second device 104. One or more wireless communication channels may be established amongst the client devices 202, e.g., using one or more of the techniques described above, to enable the respective client devices 202 to exchange such file chunks with the other client devices 202 of the proximity group.

As shown in FIG. 7B, in some implementations, client devices 202 within the proximity group (e.g., the first device 102, the second device 104, and the third device 106) may individually reconstruct the file 108 using the file chunks it receives from the computing system 100 and the other client devices 202. For instance, in the illustrated example, the first device 102 may reconstruct the file 108 using the first file portion 110a it received from the computing system 100, the second file portion 110b it received from the second device 104, and the third file portion 110c it received from the third device 106; the second device 104 may reconstruct the file 108 using the second file portion 110b it received from the computing system 100, the first file portion 110a it received from the first device 102, and the third file portion 110c it received from the third device 106; and the third device 106 may reconstruct the file 108 using the third file portion 110c it received from the computing system 100, the first file portion 110a it received from the first device 102, and the second file portion 110b it received from the second device 104. In some implementations, if the entirety of the file 108 was encrypted by the computing system 100 prior to being divided into multiple chunks, the individual client devices 202 may first separately reassemble the encrypted chunks received from the other client devices 202, and the use a decryption key received from the computing system 100 to decrypt that assembly of encrypted chunks to yield a complete copy of the file 108. In other implementations, if the file chunks were separately encrypted by the computing system 100 prior to sending them to the respective client devices 202, the respective client devices 202 may use a decryption key received from the computing system 100 to decrypt respective chunks of the file 108 (received from the computing system 100 and the other client devices 202), prior to merging the various chunks to reconstruct the file 108.

Figure 8A:
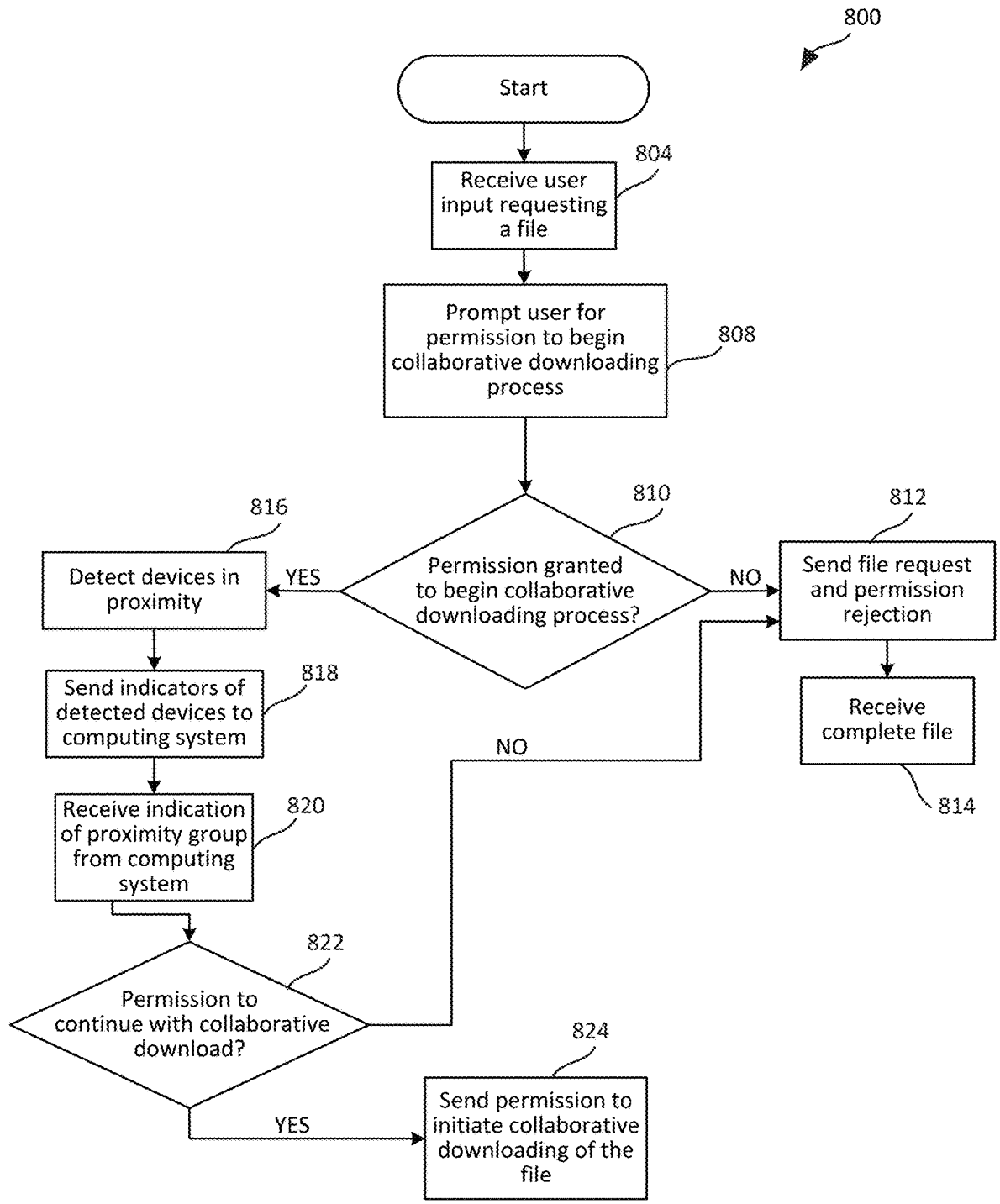
FIG. 8A illustrates an example process that may be performed by an application of one of the client devices shown in FIGS. 1A-1B, 6A-6D, and 7A-B to initiate the collaborative downloading of a file or data object in accordance with some embodiments.

FIG. 8A illustrates an example process 800 that may be performed by a client application requesting a download of a file or data object using collaborative downloading, in accordance with some embodiments. In some implementations, a user may operate a client device 202 to request a download of a file on the user's client device 202 (e.g., the first device 102) through a client application, such as the ShareFile® mobile app and the ShareFile® desktop app offered by Citrix Systems, Inc., of Fort Lauderdale, Fla. In some implementations, the client application may include a graphical user interface (GUI) providing navigation tools for a link to download the file. In some implementations, the client device 202 may receive a message, such as an email or text message, which may include a link or command to download the file through the client application.

As shown in FIG. 8A, in some implementations, the process 800 may begin with the operation 804 of receiving user input requesting a file (e.g., the file 108), such as via the GUI of the client application. In response to receiving the user input requesting the file, the client application may perform the operation 808 to cause the client device 202 to output a prompt to the user, via the client application, for permission to begin a collaborative downloading process to obtain the requested file. As noted above, for example, in some implementations, the client application may cause the client device 202 to display the prompt "Identify nearby devices for collaborative downloading?" and request either a "Yes" or a "No" response.

At the decision 810, the process 800 may continue based on the permission indicator received from the user in response to the prompt. In some implementations, if the user does not grant permission to begin the collaborative downloading process, then, at the operation 812, the client application may send a request for the file to the computing system 100, e.g., the file sharing system 504, including an indication that permission was declined for collaborative downloading of the file. In response, the computing system 100 may send the complete file to client device 202 (e.g., per the operation 854 of the process 850 described below in connection with FIG. 8B) and, at the operation 814, the client application may receive the complete file from the computing system 100, e.g., the file sharing system 504.

In some implementations, if (per the decision 810) the client application determines that the user has granted permission to begin the collaborative downloading process, then, at the operation 816, the client application may direct the client device 202 to detect one or more client devices 202 (e.g., the second device 104 and the third device 106) within a proximity of the client device 202 (e.g., the first device 102). In an implementation, the detection of one or more client devices 202 within a proximity of one another may be performed using short range wireless radio, such as a Bluetooth or Wi-Fi transceiver. In some implementations, at the operation 818 of the process 800, the client application may send indicators of the detected devices to the computing system 100. As described below, the computing system 100 may use such indicators to determine a proximity group for the client device 202.

Figure 8B:
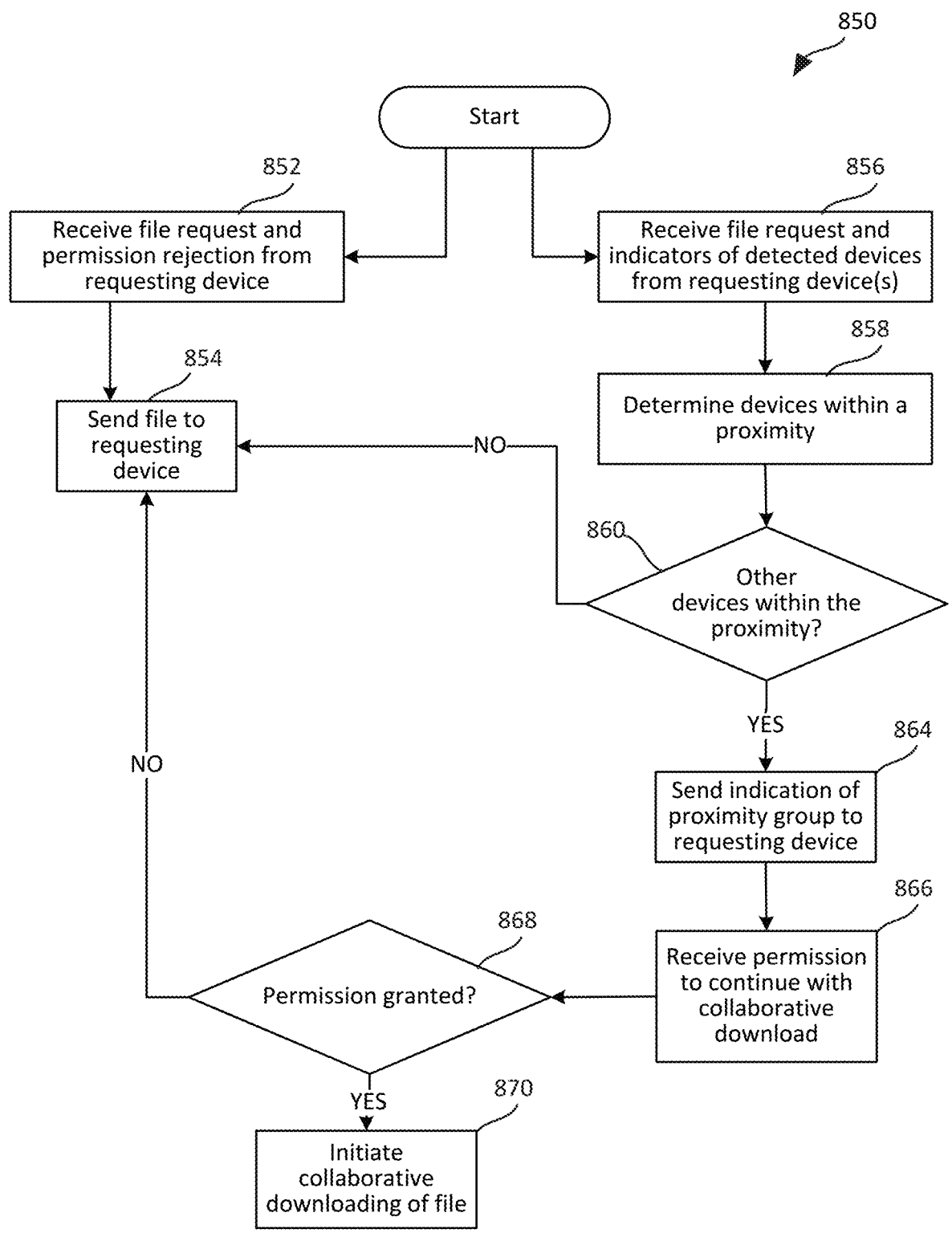
FIG. 8B illustrates an example process that may be performed by the computing system shown in FIGS. 1A-1B, 6A-6D, and 7A-B to initiate the collaborative downloading of a file or data object to a client device in accordance with some embodiments.

In some implementations, at the operation 820, the client application may receive an indication of the determined proximity group, e.g., identifiers of the other client devices 202 and/or users operating such devices, from the computing system 100 (e.g., per the operation 864 of the process 850 shown in FIG. 8B). In response to receiving such an indication, in some implementations, the client application of the requesting client device 202 may display indication(s) of the identified client devices 202 and/or the users of those devices, and may output an additional prompt requesting approval to participate in collaborative sharing with the identified client devices 202 and/or users. As described above, such an additional prompt may include a request for permission to continue the download of the file using collaborative downloading with the identified proximity group.

At the decision 822, the process 800 may continue based on the permission indicator received from the user in relation to the identified proximity group. In some implementations, if the user does not grant permission, then, at the operation 812, the client application may send a request for the file to the computing system 100, including an indication that permission was rejected. In response, the computing system 100 may send the complete file to client device 202 (e.g., per the operation 854 of the process 850 described below in connection with FIG. 8B) and, at the operation 814, the client application may receive the complete file from the computing system 100. Alternatively, if the user grants permission to continue with the identified proximity group for the collaborative download, then, in some implementations, the client application, at the operation 824, may send an approval indication for initiating the collaborative download to the computing system 100. As described below in connection with FIG. 8B, the computing system 100 may receive such an approval indication at the operation 866 of the process 850. Further details concerning how such collaborative downloading may be accomplished in some implementations are provided below in connection with FIGS. 9A-9C.

FIG. 8B illustrates an example process 850 that may be performed by computing system 100, e.g., the file sharing system 504, in conjunction with the example process 800 (shown in FIG. 8A) that may be performed by one or more client devices 202, in accordance with some embodiments. As shown in FIG. 8B, some implementations, the process 850 may begin when the computing system 100 receives a request from a client device 202 to download a file 108, with the request including an indication as to whether the user of the client device 202 has granted permission to begin the collaborative downloading process. In particular, the process 850 may involve the operation 852 when the user has not granted such permission, and may involve the operation 856 when the user has granted such permission.

More specifically, at the operation 852 of the process 850, the computing system 100 may receive a file request and an indication that the user of the client device 202 has not granted permission to begin the collaborative downloading process. In response to not receiving permission (at the operation 852), the computing system 100, at the operation 854, may, in some implementations, send the complete file to the requesting client device 202.

At the operation 856 of the process 850, on the other hand, the computing system 100 may receive a file request and an indication that the user of the client device 202 has granted permission to begin the collaborative downloading process. In some implementations, the file request received at operation 856 may include indicators of detected devices within a proximity of the client devices 202, such as the indicators sent by the client application at the operation 818 of the process 800 (shown in FIG. 8A).

At an operation 858 of the process 850, the computing system 100 may, in some implementations, use the indicators received from one or more client devices 202 (per the operation 856) to determine a set of client devices 202 that are within a proximity of one another and have requested the same file, e.g., by determining a proximity group, as described above. For example, the computing system 100 may receive ten file requests that request the same file and include indicators of detected nearby devices (per the operation 856). Continuing the example, utilizing the received indicators, or alternatively in some implementations, GPS data of one or more client devices 202, the computing system 100 may determine that five client devices 202 are within a first proximity of one another, four client devices 202 are within a second proximity of one another, and the final client device 202 does not have any client devices 202 within its proximity.

In some implementations, the computing system 100, at the decision 860, may use the determination of the operation 858 for continuing the process 850. In some implementations, if it is determined, at the decision 860, that a proximity group was identified (at the operation 858) for the requesting client device 202, then, at the operation 864, an indication of the proximity group may be sent to the requesting client device 202. As noted above in connection with FIG. 8, the client application of the requesting client device 202 may receive such an indication at the operation 820 of the process 800. As described in connection with the operation 820, in some implementations, the computing system 100 may send identifiers of the other client devices 202 and/or users operating such devices in the proximity group to the requesting client device 202. In the alternative, at the decision 860, if a proximity group was not identified (at the operation 858) for the requesting client device 202, then, in some implementations, the process 850 may execute the operation 854 (described above) to send the complete file to the requesting device 202.

Continuing the previous example, for the group of five client devices 202 within a first proximity and the group of four client devices 202 within a second proximity, the computing system 100 may execute the operation 864 to send a first indication of the first proximity group to the client devices 202 of the first proximity group and to send a second indication of the second proximity group to the client devices 202 of the second proximity group. For the final client device 202 for which a proximity group was not identified, the computing system 100 may execute the operation 854 and send the complete file to the final client device 202 that was not a part of a proximity group.

In response to the operation 864 of sending the indication of the proximity group to the client device(s) 202, in some implementations, the computing system 100 may receive, at the operation 866, a permission indication from the client device 202 to continue participation in collaborative downloading of the file 108. In some implementations, the operation 866 of receiving a permission indicator from the client device 202 may correspond to the operation 824 of the process 800 (shown in FIG. 8A) of the client device 202 sending the permission indicator.

In some implementations, at the decision 868, a determination may be made based on the permission indicator received at the operation 866. If, at the operation 866, the computing system 100 received an approval indication from the client device 202 to continue with collaborative downloading of the file 108 with the identified proximity group, then the computing system 100 may execute the operation 870 to initiate the collaborative downloading of the file 108 for the requesting client device 202. Further details of the collaborative downloading are found in the description related to FIGS. 9A-9C. If, at the operation 866, the computing system 100 received an indication from the client device 202 declining to continue with collaborative downloading of the file 108 with the identified proximity group, then the computing system 100 may execute the operation 854 and send the complete file to the requesting client device 202 instead of participating in the collaborative download of the file 108 with the identified proximity group.

Figure 9A:
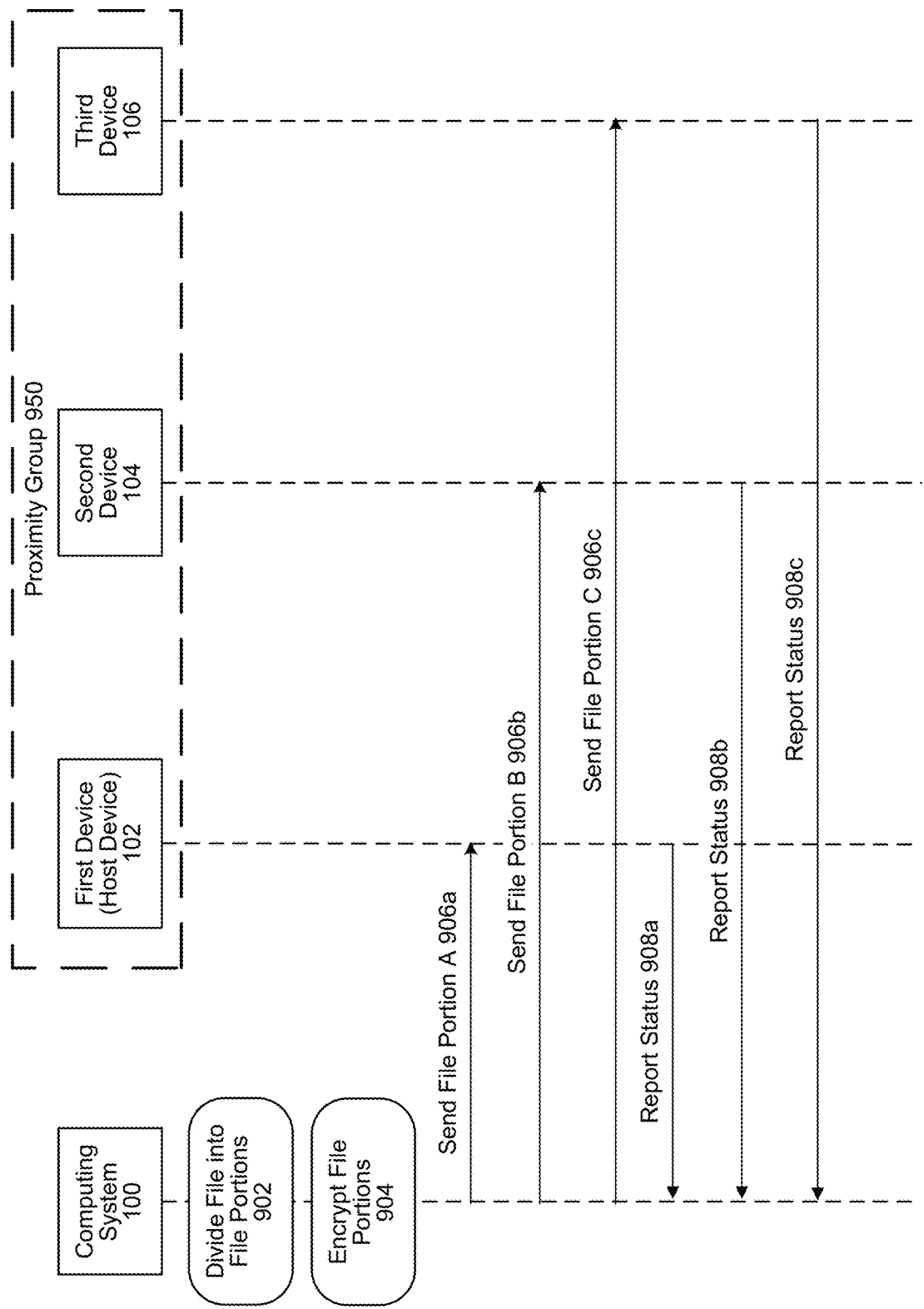
FIG. 9A illustrates a first portion of an example process for collaboratively downloading a file from a computing system to multiple client devices based on a proximity of the client devices, in accordance with some embodiments.
Figure 9B:
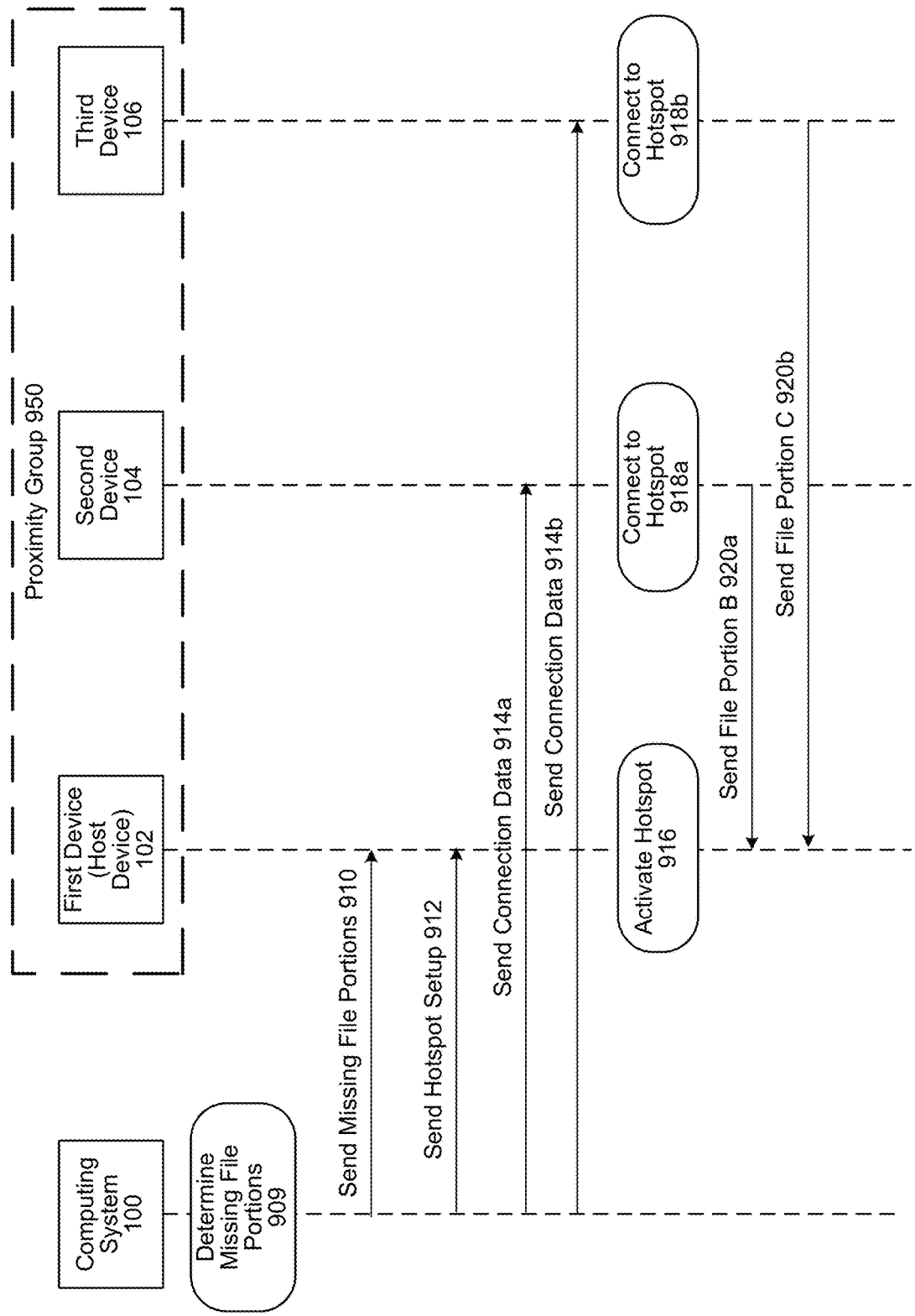
FIG. 9B illustrates a second portion of the example process partially depicted in FIG. 9A.
Figure 9C:
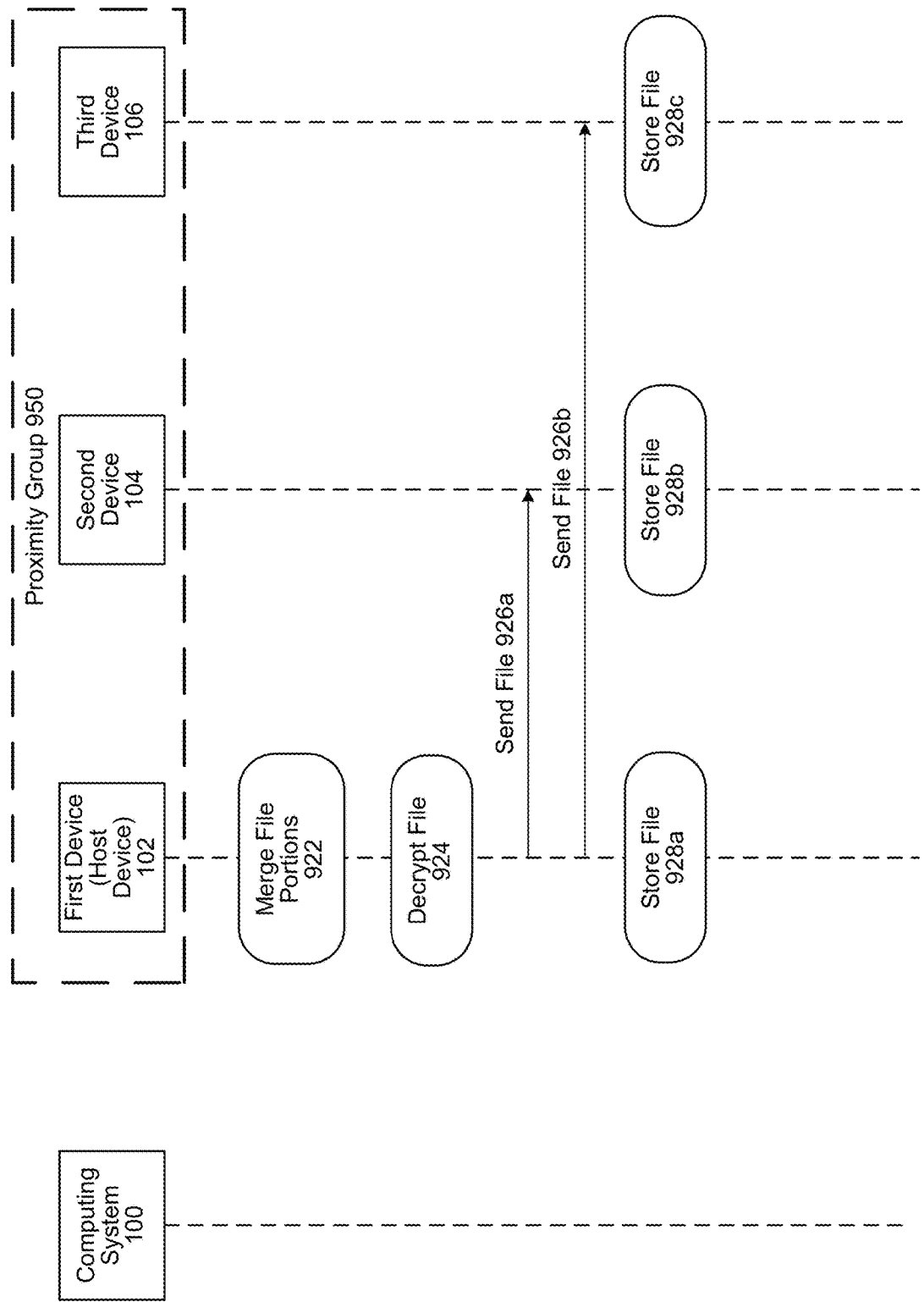
FIG. 9C illustrates a third portion of the example process partially depicted in FIG. 9A.

FIGS. 9A-9C illustrate an example process for a file download through collaborative downloading based on a proximity of client devices 202, in accordance with some embodiments. The example process illustrated in FIGS. 9A-9C may be preceded by the example process described above with reference to FIGS. 8A-8B, and may involve three client devices 202 (e.g., the first device 102, the second device 104, and the third device 106) identified as a proximity group 950 (shown in FIGS. 9A-9C). Although three such client devices 202 (e.g., the first device 102, the second device 104, and the third device 106) are shown in FIGS. 9A-9C, it should be appreciated that additional or fewer client devices 202 may be employed in some implementations. Additionally, although only one proximity group (i.e., proximity group 950) is shown in FIGS. 9A-9C, it should be appreciated that additional proximity groups may be employed in some implementations. As described above with reference to FIGS. 8A-8B, the proximity group 950 may include client devices 202 that may have provided permission to download the same file using collaborative downloading and are located within a proximity of one another. The proximity may be a range in which the client devices 202 of the proximity group 950 may communicate (e.g., via one or more wireless peer-to-peer connections) with the other client devices 202 of the proximity group, such as through a Wi-Fi hotspot.

As described in reference to FIG. 8B, the computing system 100 may determine the client devices 202 within the proximity group 950 (e.g., the first device 102, the second device 104, and the third device 106). In some implementations, the computing system 100 may divide (902) the file 108 into file portions, referred to above as "chunks." The number of file portions may be based on the number of client devices 202 in a proximity group 950. To ensure privacy and security, in some implementations, the file portions and/or an entirety of the file 108 may be encrypted (904) using encryption algorithms such as Rivest-Shamir-Adleman (RSA) encryption or Triple Data Encryption Standard (DES) encryption.

In some implementations, the computing system 100 may send different file portions to the respective client devices 202 of the proximity group 950. Referring to FIG. 9A, the computing system 100 may send (906a) "File Portion A" to the first device 102, may send (906b) "File Portion B" to the second device 104, and may send (906c) "File Portion C" to the third device 106. In response to receiving the file portions, the individual client devices 202 in the proximity group 950 may report (908a, 908b, and 908c) receipt of the respective file portions to the computing system 100.

In some implementations, and referring to FIG. 9B, the computing system 100 may determine (909) if any file portions were not received. If the computing system 100 determines that any file portions were not received by the respective client device 202, the computing system 100 may send (910) the missing file portions to the host device (e.g., the first device 102).

In some implementations, the computing system 100 may send (912) information to the host device (e.g., the first device 102) for establishing a connection point among the client devices 202 of the proximity group 950 (e.g., the first device 102, the second device 104, and the third device 106). For example, the computing system 100 may provide instructions to the host device for establishing a Wi-Fi hotspot, the instructions indicating information such as the Wi-Fi hotspot name, a service set identifier (SSID) for the Wi-Fi hotspot, and a password for connecting to the Wi-Fi hotspot. In some implementations, computing system 100 may send (914a, 914b) data for connecting to the host device to the one or more other client devices 202 in the proximity group 950 (e.g., the second device 104 and the third device 106). Continuing the example of using a Wi-Fi hotspot, the one or more other client devices 202 may receive information such as the Wi-Fi hotspot name and the password for connecting to the Wi-Fi hotspot of the host device.

In some implementations, the host device (e.g., the first device 102) may activate (916) the wireless connection point, such as the Wi-Fi hotspot, using the instructions provided (912) by the computing system 100. The one or more other client devices 202 of the proximity group 950 may connect (918a, 918b) to the wireless connection point, such as a Wi-Fi hotspot, using the data provided (914a, 914b) by the computing system 100. In response to the client devices 202 of the proximity group 950 establishing a connection with the host device (e.g., the first device 102), individual client devices 202 (e.g., the second device 104 and the third device 106) may send (920a, 920b) their respective file portions to the host device. For example, the second device 104 may send (920a) "File Portion B" to the first device 102 and the third device 106 may send (920b) "File Portion C" to the first device 102.

Referring to FIG. 9C, the host device (e.g., the first device 102) may merge (922) the file portions (e.g., "File Portion A," "File Portion B," and "File Portion C") to reconstruct a representation of the requested file 108. As noted above, if the entirety of the file 108 was encrypted by the computing system 100 prior to being divided into multiple chunks, the computing system may decrypt (924) the reassembled chunks to yield a copy of the original file 108. In some implementations, the host device (e.g., the first device 102) may obtain from the computing system 100, or otherwise be provided with, a decryption key to decrypt the file 108. As was also noted above, in other implementations, if the file chunks were separately encrypted by the computing system 100 prior to sending them to the respective client devices 202, the host device (e.g., the first device 102) may use a decryption key received from the computing system 100 (or otherwise obtained) to decrypt respective chunks of the file (received from the computing system 100 and the other client devices 202), prior to merging the various chunks to reconstruct the file 108.

In some implementations, the host device (e.g., the first device 102) may send (926a, 926b) the reconstructed file 108 to the one or more other client devices 202 of the proximity group (e.g., the second device 104 and the third device 106) using the previously established wireless connection point, such as the Wi-Fi hotspot. In some implementations, the devices of the proximity group (e.g., the first device 102, the second device 104, and the third device 106) may store (928a, 928b, 928c) respective copies of the file 108.

G. Example Implementations of Methods, Systems, and Computer-Readable Media in Accordance with the Present Disclosure The following paragraphs (M1) through (M18) describe examples of methods that may be implemented in accordance with the present disclosure.

(M1) A method may be performed that involves receiving, by a computing system and from a first remote device, a first request for a file; determining, by the computing system, that at least a second remote device is within a proximity of the first remote device; dividing, by the computing system, the file into at least a first portion and a second portion; sending, from the computing system to the first remote device, the first portion of the file; sending, from the computing system to the second remote device, the second portion of the file; and sending, from the computing system to the second remote device, first data to enable the second remote device to establish a connection with the first remote device, for transfer of at least the second portion of the file to the first remote device via the connection with the second remote device.

(M2) A method may be performed as described in paragraph (M1), and may further involve receiving, by the computing system and from the first remote device, an indication that the second remote device is within the proximity of the first remote device; wherein determining that the second remote device is within the proximity of the first remote device may be based at least in part on the indication.

(M3) A method may be performed as described in a paragraph (M1) or paragraph (M2), and may further involve receiving, by the computing system and from the second remote device, a second request for the file.

(M4) A method may be performed as described in paragraph (M3), and may further involve receiving, by the computing system and from the second remote device, permission for the second remote device to participate in shared download of the file.

(M5) A method may be performed as described in paragraph (M4), wherein sending the second portion of the file may be based at least in part on the second request for the file and the permission.

(M6) A method may be performed as described in any of paragraphs (M1) through (M5), and may further involve sending, from the computing system to the first remote device, second data to enable the second remote device to establish the connection with the first remote device.

(M7) A method may be performed as described in paragraph (M6), wherein the first data may enable the first remote device to establish a wireless network to which the second remote device can connect, and the second data may enable the second remote device to connect to the wireless network established by the first remote device.

(M8) A method may be performed as described in any of paragraphs (M1) through (M7), and may further involve determining that at least a second remote device is within a proximity of the first remote device based on at least one global positioning system (GPS) coordinate.

(M9) A method may be performed as described in any of paragraphs (M1) through (M8), and may further involve encrypting the first portion of the file and the second portion of the file.

(M10) A method may be performed as described in any of paragraphs (M1) through (M9), and may further involve receiving, by the computing system and from a third remote device, a third request for the file; determining, by the computing system, that the third remote device is not within the proximity of the first remote device; and sending, from the computing system to the third remote device, the file.

(M11) A method may be performed that involves sending, from a first device to a remote computing system, a request for a file from the remote computing system; establishing, by the first device, a wireless connection with at least a second device in proximity of the first device; receiving, by the first device and from the remote computing system, a first portion of the file; receiving, by the first device and from the second device via the wireless connection, a second portion of the file; and combining, by the first device, the first portion of the file and the second portion of the file to generate a complete copy of the file.

(M12) A method may be performed as described in paragraph (M11), and may further involve sending, from the first device to the second device, at least the first portion of the file.

(M13) A method may be performed as described in paragraph (M11) or paragraph (M12), and may further involve sending, from the first device to the second device, the complete copy of the file.

(M14) A method may be performed as described in any of paragraphs (M11) through (M13), and may further involve determining, by the first device, that at least the second device is within a proximity of the first device; and sending, from the first device, to the remote computing system, an indication that the second device is within the proximity.

(M15) A method may be performed as described in paragraph (M14), wherein determining that the second device is within the proximity may involve detecting a Bluetooth transmission identifying the second device.

(M16) A method may be performed as described in any of paragraphs (M11) through (M15), and may further involve receiving, by the first device and from the remote computing system, an instruction to establish a wireless network to enable the wireless connection with the second device.

(M17) A method may be performed as described in any of paragraphs (M11) through (M16), and may further involve decrypting, by the first device and using an encryption key, the first portion of the file received from the remote computing system.

(M18) A method may be performed as described in paragraph (M17), and may further involve decrypting, by the first device and using the encryption key, the second portion of the file received from the second device.

The following paragraphs (SI) through (S18) describe examples of systems and devices that may be implemented in accordance with the present disclosure.

(S1) A system may include at least one processor and at least one computer-readable medium encoded with instruction which, when executed by the at least one processor, cause the system to receive, from a first remote device, a first request for a file; to determine that at least a second remote device is within a proximity of the first remote device; to divide the file into at least a first portion and a second portion; to send, to the first remote device, the first portion of the file; to send, to the second remote device, the second portion of the file; and to send, to the second remote device, first data to enable the second remote device to establish a connection with the first remote device, for transfer of at least the second portion of the file to the first remote device via the connection with the second remote device.

(S2) A system may be configured as described in paragraph (S1), and the at least one computer-readable medium may be further encoded with additional instructions which, when executed by the at least one processor, further cause the system to receive, from the first remote device, an indication that the second remote device is within the proximity of the first remote device; and to determine that the second remote device is within the proximity of the first remote device based at least in part on the indication.

(S3) A system may be configured as described in of paragraph (S1) or paragraph (S2), and the at least one computer-readable medium may be further encoded with additional instructions which, when executed by the at least one processor, further cause the system to receive, from the second remote device, a second request for the file.

(S4) A system may be configured as described in paragraph (S3), and the at least one computer-readable medium may be further encoded with additional instructions which, when executed by the at least one processor, further cause the system to receive, from the second remote device, permission for the second remote device to participate in shared download of the file.

(S5) A system may be configured as described in paragraph (S4), and the at least one computer-readable medium may be further encoded with additional instructions which, when executed by the at least one processor, further cause the system to send the second portion of the file based at least in part on the second request for the file and the permission.

(S6) A system may be configured as described in any of paragraphs (S1) through (S5), and the at least one computer-readable medium may be further encoded with additional instructions which, when executed by the at least one processor, further cause the system to send, to the first remote device, second data to enable the second remote device to establish the connection with the first remote device.

(S7) A system may be configured as described in paragraph (S6), wherein the first data may enable the first remote device to establish a wireless network to which the second remote device can connect, and the second data may enable the second remote device to connect to the wireless network established by the first remote device.

(S8) A system may be configured as described in any of paragraphs (S1) through (S7), and the at least one computer-readable medium may be further encoded with additional instructions which, when executed by the at least one processor, further cause the system to determine that at least a second remote device is within a proximity of the first remote device based on at least one global positioning system (GPS) coordinate.

(S9) A system may be configured as described in any of paragraphs (S1) through (S8), and the at least one computer-readable medium may be further encoded with additional instructions which, when executed by the at least one processor, further cause the system to encrypt the first portion of the file and the second portion of the file.

(S10) A system may be configured as described in any of paragraphs (S1) through (S9), and the at least one computer-readable medium may be further encoded with additional instructions which, when executed by the at least one processor, further cause the system to receive, from a third remote device, a third request for the file; to determine that the third remote device is not within the proximity of the first remote device; and to send, to the third remote device, the file.

(S11) A system may include at least one processor and at least one computer-readable medium encoded with instruction which, when executed by the at least one processor, cause the system to send, from a first device to a remote computing system, a request for a file from the computing system; to establish, by the first device, a wireless connection with at least a second device in proximity of the first device; to receive, by the first device and from the remote computing system, a first portion of the file; to receive, by the first device and from the second device via the wireless connection, a second portion of the file; and to combine, by the first device, the first portion of the file and the second portion of the file to generate a complete copy of the file.

(S12) A system may be configured as described in paragraph (S11), and the at least one computer-readable medium may be further encoded with additional instructions which, when executed by the at least one processor, further cause the system to send, from the first device to the second device, at least the first portion of the file.

(S13) A system may be configured as described in paragraph (S11) or paragraph (S12), and the at least one computer-readable medium may be further encoded with additional instructions which, when executed by the at least one processor, further cause the system to send, from the first device to the second device, the complete copy of the file.

(S14) A system may be configured as described in any of paragraphs (S11) through (S13), and the at least one computer-readable medium may be further encoded with additional instructions which, when executed by the at least one processor, further cause the system to determine, by the first device, that at least the second device is within a proximity of the first device; and to send, from the first device to the remote computing system, an indication that the second device is within the proximity.

(S15) A system may be configured as described in paragraph (S14), and the at least one computer-readable medium may be further encoded with additional instructions which, when executed by the at least one processor, further cause the system to determine that the second device is within the proximity at least in part by detecting a Bluetooth transmission identifying the second device.

(S16) A system may be configured as described in any of paragraphs (S11) through (S15), and the at least one computer-readable medium may be further encoded with additional instructions which, when executed by the at least one processor, further cause the system to receive, by the first device and from the remote computing system, an instruction to establish a wireless network to enable the wireless connection with the second device.

(S17) A system may be configured as described in any of paragraphs (S11) through (S16), and the at least one computer-readable medium may be further encoded with additional instructions which, when executed by the at least one processor, further cause the system to decrypt, by the first device and using an encryption key, the first portion of the file received from the remote computing system.

(S18) A system may be configured as described in paragraph (S17), and the at least one computer-readable medium may be further encoded with additional instructions which, when executed by the at least one processor, further cause the system to decrypt, by the first device and using the encryption key, the second portion of the file received from the second device.

The following paragraphs (CRM1) through (CRM18) describe examples of computer-readable media that may be implemented in accordance with the present disclosure.

(CRM1) At least one non-transitory, computer-readable medium may be encoded with instructions which, when executed by at least one processor included in a system, cause the system to receive, from a first remote device, a first request for a file; to determine that at least a second remote device is within a proximity of the first remote device; to divide the file into at least a first portion and a second portion; to send, to the first remote device, the first portion of the file; to send, to the second remote device, the second portion of the file; and to send, to the second remote device, first data to enable the second remote device to establish a connection with the first remote device, for transfer of at least the second portion of the file to the first remote device via the connection with the second remote device.

(CRM2) At least one non-transitory computer-readable medium may be configured as described in paragraph (CRM1), and may be further encoded with additional instructions which, when executed by the at least one processor, further cause the system to receive, from the first remote device, an indication that the second remote device is within the proximity of the first remote device; and to determine that the second remote device is within the proximity of the first remote device based at least in part on the indication.

(CRM3) At least one non-transitory computer-readable medium may be configured as described in paragraph (CRM1) or paragraph (CRM2), and may be further encoded with additional instructions which, when executed by the at least one processor, further cause the system to receive, from the second remote device, a second request for the file.

(CRM4) At least one non-transitory computer-readable medium may be configured as described in paragraph (CRM3), and may be further encoded with additional instructions which, when executed by the at least one processor, further cause the system to receive, from the second remote device, permission for the second remote device to participate in shared download of the file.

(CRM5) At least one non-transitory computer-readable medium may be configured as described in paragraph (CRM4), and may be further encoded with additional instructions which, when executed by the at least one processor, further cause the system to send the second portion of the file based at least in part on the second request for the file and the permission.

(CRM6) At least one non-transitory computer-readable medium may be configured as described in any of paragraphs (CRM1) through (CRM5), and may be further encoded with additional instructions which, when executed by the at least one processor, further cause the system to send, to the first remote device, second data to enable the second remote device to establish the connection with the first remote device.

(CRM7) At least one non-transitory computer-readable medium may be configured as described in paragraph (CRM6), wherein the first data may enable the first remote device to establish a wireless network to which the second remote device can connect, and the second data may enable the second remote device to connect to the wireless network established by the first remote device.

(CRM8) At least one non-transitory computer-readable medium may be configured as described in any of paragraphs (CRM1) through (CRM7), and may be further encoded with additional instructions which, when executed by the at least one processor, further cause the system to determine that at least a second remote device is within a proximity of the first remote device based on at least one global positioning system (GPS) coordinate.

(CRM9) At least one non-transitory computer-readable medium may be configured as described in any of paragraphs (CRM1) through (CRM8), and may be further encoded with additional instructions which, when executed by the at least one processor, further cause the system to encrypt the first portion of the file and the second portion of the file.

(CRM10) At least one non-transitory computer-readable medium may be configured as described in any of paragraphs (CRM1) through (CRM9), and may be further encoded with additional instructions which, when executed by the at least one processor, further cause the system to receive, from a third remote device, a third request for the file; to determine that the third remote device is not within the proximity of the first remote device; and to send, to the third remote device, the file.

(CRM11) At least one non-transitory, computer-readable medium may be encoded with instructions which, when executed by at least one processor included in a system, cause the system to send, from a first device to a remote computing system, a request for a file from the remote computing system; to establish, by the first device, a wireless connection with at least a second device in proximity of the first device; to receive, by the first device and from the remote computing system, a first portion of the file; to receive, by the first device and from the second device via the wireless connection, a second portion of the file; and to combine, by the first device, the first portion of the file and the second portion of the file to generate a complete copy of the file.

(CRM12) At least one non-transitory computer-readable medium may be configured as described in paragraph (CRM11), and may be further encoded with additional instructions which, when executed by the at least one processor, further cause the system to send, from the first device to the second device, at least the first portion of the file.

(CRM13) At least one non-transitory computer-readable medium may be configured as described in paragraph (CRM11) or paragraph (CRM12), and may be further encoded with additional instructions which, when executed by the at least one processor, further cause the system to send, from the first device to the second device, the complete copy of the file.

(CRM14) At least one non-transitory computer-readable medium may be configured as described in any of paragraphs (CRM11) through (CRM13), and may be further encoded with additional instructions which, when executed by the at least one processor, further cause the system to determine, by the first device, that at least the second device is within a proximity of the first device; and to send, from the first device, to the remote computing system, an indication that the second device is within the proximity.

(CRM15) At least one non-transitory computer-readable medium may be configured as described in paragraph (CRM14), and may be further encoded with additional instructions which, when executed by the at least one processor, further cause the system to determine that the second device is within the proximity at least in part by detecting a Bluetooth transmission identifying the second device.

(CRM16) At least one non-transitory computer-readable medium may be configured as described in any of paragraphs (CRM11) through (CRM15), and may be further encoded with additional instructions which, when executed by the at least one processor, further cause the system to receive, by the first device and from the remote computing system, an instruction to establish a wireless network to enable the wireless connection with the second device.

(CRM17) At least one non-transitory computer-readable medium may be configured as described in any of paragraphs (CRM11) through (CRM16), and may be further encoded with additional instructions which, when executed by the at least one processor, further cause the system to decrypt, by the first device and using an encryption key, the first portion of the file received from the computing system.

(CRM18) At least one non-transitory computer-readable medium may be configured as described in paragraph (CRM17), and may be further encoded with additional instructions which, when executed by the at least one processor, further cause the system to decrypt, by the first device and using the encryption key, the second portion of the file received from the second device.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   receiving, by a computing system and from a first remote device, a first request for a file;
   determining, by the computing system, that at least a second remote device is within a proximity of the first remote device;
   dividing, by the computing system, the file into at least a first portion and a second portion;
   sending, from the computing system to the first remote device, the first portion of the file;
   sending, from the computing system to the second remote device, the second portion of the file; and
   sending, from the computing system to the second remote device, first data to enable the second remote device to establish a connection with the first remote device, for transfer of at least the second portion of the file to the first remote device via the connection with the second remote device.

2. The method of claim 1, further comprising:
   receiving, by the computing system and from the first remote device, an indication that the second remote device is within the proximity of the first remote device;
   wherein determining that the second remote device is within the proximity of the first remote device is based at least in part on the indication.

3. The method of claim 1, further comprising:
   receiving, by the computing system and from the second remote device, a second request for the file.

4. The method of claim 3, further comprising:
   receiving, by the computing system and from the second remote device, permission for the second remote device to participate in shared download of the file.

5. The method of claim 4, wherein sending the second portion of the file is based at least in part on the second request for the file and the permission.

6. The method of claim 1, further comprising:
   sending, from the computing system to the first remote device, second data to enable the second remote device to establish the connection with the first remote device.

7. The method of claim 6, wherein:
   the first data enables the first remote device to establish a wireless network to which the second remote device can connect, and
   the second data enables the second remote device to connect to the wireless network established by the first remote device.

8. The method of claim 1, wherein determining that at least a second remote device is within a proximity of the first remote device is based on at least one global positioning system (GPS) coordinate.

9. The method of claim 1, further comprising:
   encrypting the first portion of the file and the second portion of the file.

10. The method of claim 1, further comprising:
    receiving, by the computing system and from a third remote device, a third request for the file;
    determining, by the computing system, that the third remote device is not within the proximity of the first remote device; and
    sending, from the computing system to the third remote device, the file.

11. A method, comprising:
    sending, from a first device to a remote computing system, a request for a file from the remote computing system;
    determining, by the first device, that at least a second device is within a proximity of the first device;
    sending, from the first device to the remote computing system, an indication that the second device is within the proximity;
    establishing, by the first device, a wireless connection with at least the second device;
    receiving, by the first device and from the remote computing system, a first portion of the file;
    receiving, by the first device and from the second device via the wireless connection, a second portion of the file; and
    combining, by the first device, the first portion of the file and the second portion of the file to generate a complete copy of the file.

12. The method of claim 11, further comprising:
    sending, from the first device to the second device, at least the first portion of the file.

13. The method of claim 11, further comprising:
    sending, from the first device to the second device, the complete copy of the file.

14. The method of claim 11, wherein determining that the second device is within the proximity comprises:
    detecting a Bluetooth transmission identifying the second device.

15. The method of claim 11, further comprising:
receiving, by the first device and from the remote computing system, an instruction to establish a wireless network to enable the wireless connection with the second device.

16. The method of claim 11, further comprising:
decrypting, by the first device and using an encryption key, the first portion of the file received from the remote computing system.

17. The method of claim 16, further comprising:
decrypting, by the first device and using the encryption key, the second portion of the file received from the second device.

18. A system, comprising:
at least one processor; and
at least one computer-readable medium encoded with instructions which, when executed by the at least one processor, cause the system to:
receive, from a first remote device, a first request for a file;
determine that at least a second remote device is within a proximity of the first remote device;
divide the file into at least a first portion and a second portion;
send, to the first remote device, the first portion of the file;
send, to the second remote device, the second portion of the file; and
send, to the second remote device, first data to enable the second remote device to establish a connection with the first remote device, for transfer of at least the second portion of the file to the first remote device via the connection with the second remote device.

19. The system of claim 18, wherein the at least one computer-readable medium is further encoded with additional instructions which, when executed by the at least one processor, further cause the system to:
receive, from the first remote device, an indication that the second remote device is within the proximity of the first remote device; and
determine that the second remote device is within the proximity of the first remote device based at least in part on the indication.

\* \* \* \* \*